US008612858B2

(12) United States Patent
Meaney et al.

(10) Patent No.: US 8,612,858 B2
(45) Date of Patent: Dec. 17, 2013

(54) CONDENSING GRAPHICAL REPRESENTATIONS OF MEDIA CLIPS IN A COMPOSITE DISPLAY AREA OF A MEDIA-EDITING APPLICATION

(75) Inventors: Brian Meaney, San Jose, CA (US); Egan Schulz, San Jose, CA (US); Mike Stern, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 770 days.

(21) Appl. No.: 12/434,612

(22) Filed: May 1, 2009

(65) Prior Publication Data
US 2010/0281377 A1 Nov. 4, 2010

(51) Int. Cl.
G06F 3/00 (2006.01)

(52) U.S. Cl.
USPC ......................................................... 715/723

(58) Field of Classification Search
USPC ......................................................... 715/723
See application file for complete search history.

(56) References Cited

U.S. PATENT DOCUMENTS

| | | | |
|---|---|---|---|
| 5,519,828 A | 5/1996 | Rayner | |
| 5,521,841 A | 5/1996 | Arman et al. | |
| 5,634,020 A | 5/1997 | Norton | |
| 5,664,216 A | 9/1997 | Blumenau | |
| 5,682,326 A | 10/1997 | Klingler et al. | |
| 5,732,184 A | 3/1998 | Chao et al. | |
| 5,760,767 A | 6/1998 | Shore et al. | |
| 5,781,188 A | 7/1998 | Amiot et al. | |
| 5,826,102 A | 10/1998 | Escobar et al. | |
| 5,847,706 A | 12/1998 | Kingsley | |
| 5,880,722 A | 3/1999 | Brewer et al. | |
| 5,999,173 A | 12/1999 | Ubillos | |
| 6,031,529 A | 2/2000 | Migos et al. | |
| 6,061,062 A | 5/2000 | Venolia | |
| 6,078,306 A * | 6/2000 | Lewis ............................ 345/685 |
| 6,134,380 A | 10/2000 | Kushizaki | |
| 6,154,600 A | 11/2000 | Newman et al. | |
| 6,154,601 A | 11/2000 | Yaegashi et al. | |
| 6,404,978 B1 | 6/2002 | Abe | |

(Continued)

FOREIGN PATENT DOCUMENTS

WO    WO 2008/151416    12/2008

OTHER PUBLICATIONS

Adobe Creative Team, Adobe Premiere Pro CS4 Classroom in a book by Adobe Press, publication date Dec. 17, 2008.*

(Continued)

*Primary Examiner* — William Bashore
*Assistant Examiner* — Hien Duong
(74) *Attorney, Agent, or Firm* — Adeli & Tollen LLP

(57) ABSTRACT

Some embodiments provide a computer readable medium storing a media editing application for creating multimedia presentations. The application includes a graphical user interface (GUI). The GUI includes a composite display area for displaying graphical representations of a set of media clips that are part of a composite presentation. Each graphical representation of a particular media clip is assigned to a particular row in the composite display area, where each row corresponds to a particular track in the composite presentation. Some embodiments of the GUI include a compression tool for assigning the graphical representations to new rows so as to reduce blank space in the composite display area, where the assignment of the graphical representations to new rows eliminates the correspondence between the rows and the tracks. Some embodiments include a collapsing tool for reducing a size of graphical representations in the composite display area.

19 Claims, 25 Drawing Sheets

(56) References Cited

U.S. PATENT DOCUMENTS

| | | | |
|---|---|---|---|
| 6,414,686 | B1 | 7/2002 | Protheroe et al. |
| 6,469,711 | B2 | 10/2002 | Foreman et al. |
| 6,470,347 | B1* | 10/2002 | Gillam ................................. 1/1 |
| 6,477,315 | B1 | 11/2002 | Ohomori |
| 6,486,896 | B1 | 11/2002 | Ubillos |
| 6,539,163 | B1 | 3/2003 | Sheasby et al. |
| 6,650,826 | B1 | 11/2003 | Hatta |
| 6,694,087 | B1 | 2/2004 | Weaver |
| 7,043,137 | B2 | 5/2006 | Slone |
| 7,073,127 | B2 | 7/2006 | Zhao et al. |
| 7,165,227 | B2 | 1/2007 | Ubillos |
| 7,325,199 | B1 | 1/2008 | Reid |
| 7,356,242 | B2 | 4/2008 | Nagasawa |
| 7,398,002 | B2 | 7/2008 | Hsiao et al. |
| 7,411,590 | B1 | 8/2008 | Boyd et al. |
| 7,434,155 | B2 | 10/2008 | Lee |
| 7,437,674 | B2 | 10/2008 | Chen |
| 7,480,864 | B2 | 1/2009 | Brook et al. |
| 7,546,532 | B1 | 6/2009 | Nichols et al. |
| 7,623,755 | B2 | 11/2009 | Kuspa |
| 7,653,550 | B2 | 1/2010 | Schulz |
| 7,770,125 | B1 | 8/2010 | Young et al. |
| 7,805,678 | B1 | 9/2010 | Niles et al. |
| 7,890,867 | B1 | 2/2011 | Margulis |
| 2001/0040592 | A1 | 11/2001 | Foreman et al. |
| 2002/0154140 | A1 | 10/2002 | Tazaki |
| 2003/0002851 | A1 | 1/2003 | Hsiao et al. |
| 2003/0090504 | A1 | 5/2003 | Brook et al. |
| 2003/0146915 | A1 | 8/2003 | Brook et al. |
| 2004/0001079 | A1 | 1/2004 | Zhao et al. |
| 2004/0071441 | A1 | 4/2004 | Foreman et al. |
| 2004/0268224 | A1 | 12/2004 | Balkus et al. |
| 2005/0237321 | A1* | 10/2005 | Young et al. .................. 345/418 |
| 2006/0008247 | A1 | 1/2006 | Minami et al. |
| 2006/0156246 | A1 | 7/2006 | Williams et al. |
| 2006/0277454 | A1 | 12/2006 | Chen |
| 2007/0118810 | A1 | 5/2007 | Ubillos |
| 2008/0044155 | A1 | 2/2008 | Kuspa |
| 2008/0152297 | A1 | 6/2008 | Ubillos |
| 2008/0152298 | A1 | 6/2008 | Ubillos |
| 2008/0155420 | A1 | 6/2008 | Ubillos et al. |
| 2008/0155421 | A1 | 6/2008 | Ubillos et al. |
| 2008/0155459 | A1 | 6/2008 | Ubillos |
| 2009/0292633 | A1* | 11/2009 | Crist ................................. 705/37 |
| 2010/0169823 | A1* | 7/2010 | Audet ............................ 715/784 |
| 2010/0281378 | A1 | 11/2010 | Pendergast et al. |

OTHER PUBLICATIONS

Anthony Bolante, Premiere Pro CS3 for Windows and Macintosh: Visual QuickPro Guide, Published by PeachPit Press on Dec. 4, 2007.*

U.S. Appl. No. 12/434,613, filed May 1, 2009, Pedergast, Colleen, et al.

Author Unknown, "Editing Stereoscopic 3D Video in Vegas Pro 9", Workflow Paper, Apr. 2, 2010, pp. 1-6, Sony Creative Software Inc., Madison, WI, USA.

Casares, Juan, et al., "Simplifying Video Editing Using Metadata," Proceedings of Designing Interactive Systems (DIS 2002), Jun. 2002, pp. 157-166, London, United Kingdom.

Chisan, James, et al., "Video Bench—Final Report: SEng 480a/CSc 586a," Apr. 11, 2003, University of Victoria.

Diakopoulos, Nicholas, et al., "Videotater: An Approach for Pen-Based Digital Video Segmentation and Tagging," Proceedings of the 19th Annual ACM Symposium on User Interface Software and Technology (UIST'06), Oct. 15-18, 2006, pp. 221-224, Montreux, Switzerland.

Long, A. Chris, et al., "Video Editing Using Lenses and Semantic Zooming," Month N/A, 2002, pp. 1-9, Carnegie Mellon University, Pittsburgh, PA, USA.

Myers, Brad A., et al., "A Multi-View Intelligent Editor for Digital Video Libraries," the First ACM+IEEE Joint Conference on Digital Libraries (JCDL'01), Jun. 24-28, 2001, pp. 106-115, Roanoke, VA, USA.

Author Unknown, "Adobe Premier Pro CS3: User Guide," Apr. 1, 2008, 455 pages, Adobe Systems Incorporated, San Jose, California, USA.

Author Unknown, "Apple Announces Final Cut Pro 4," NAB, Apr. 6, 2003, pp. 1-3, Apple Inc., Las Vegas, Nevada, USA.

Author Unknown, "iMovie '08 Getting Started," Month Unknown, 2008, pp. 1-50, Apple Inc., USA.

Author Unknown, "Using Adobe Premiere Elements 8 Editor," Last Updated Aug. 12, 2010, 313 pages, Adobe Systems Incorporated, San Jose, California, USA.

Brenneis, Lisa, "Final Cut Pro 3 for Macintosh: Visual QuickPro Guide," Apr. 2002, 288 pages, Peachpit Press, Berkeley, California, USA.

* cited by examiner

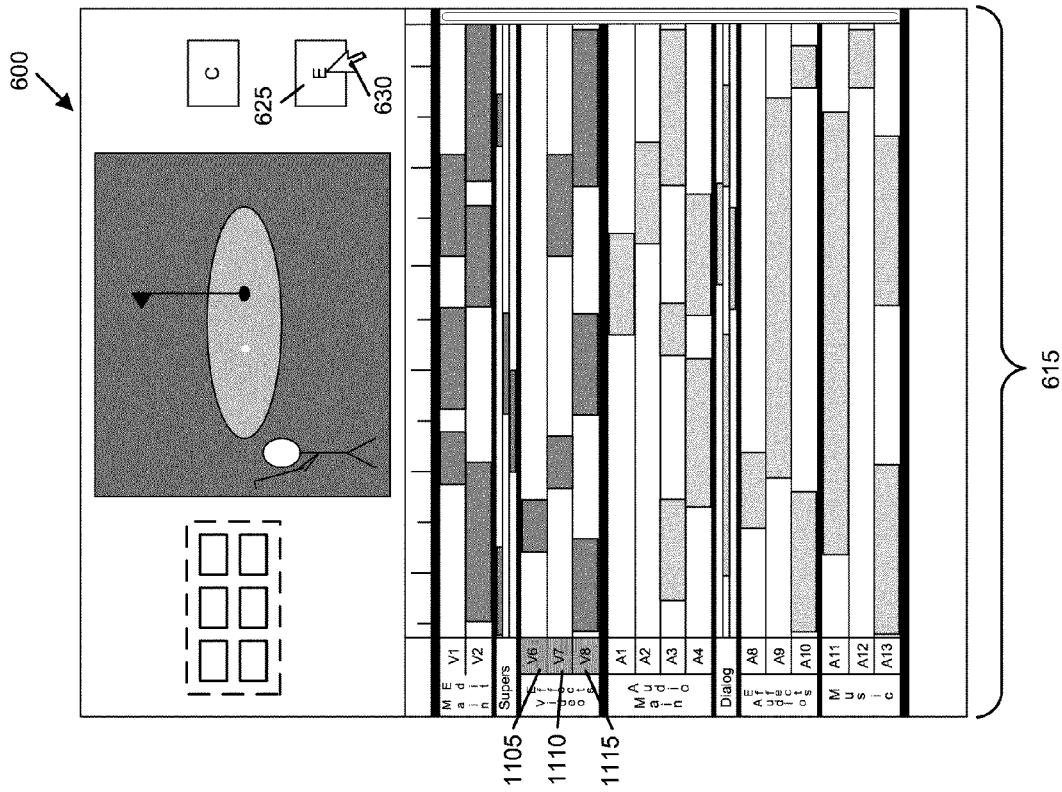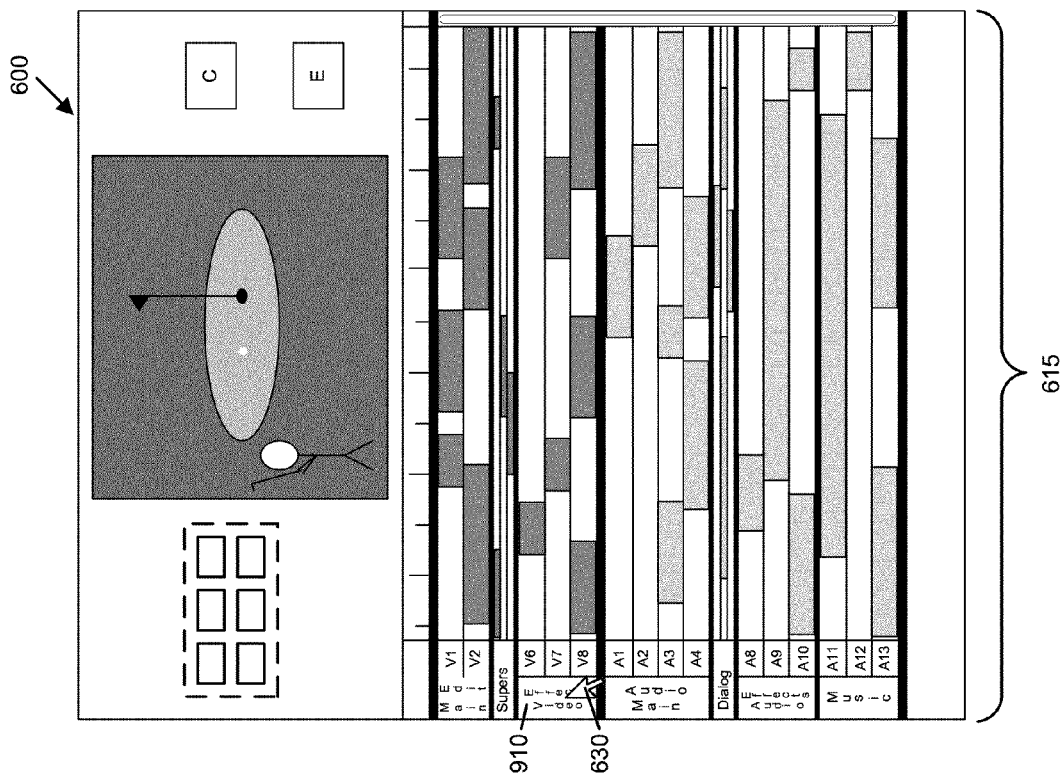
Figure 11
Figure 10

CONDENSING GRAPHICAL REPRESENTATIONS OF MEDIA CLIPS IN A COMPOSITE DISPLAY AREA OF A MEDIA-EDITING APPLICATION

FIELD OF THE INVENTION

The invention is directed towards the presentation of a composite display area in a media-editing application. Specifically, the invention is directed towards methods for condensing the display of such a composite display area.

BACKGROUND OF THE INVENTION

Media editing applications allow users to create composite multimedia presentations (e.g., movies) based on several multimedia clips, such as audio and video clips. The graphical user interface (GUI) of such a media editing application will often include a composite display area that includes several tracks that span a timeline. On the tracks, the composite display area displays rectangles or other shapes that represent the clips used to create the multimedia presentation.

Often, the composite display area cannot display all the tracks. Only a particular portion of the GUI of the application is reserved for the composite display area, and this may not be enough room to display all of the tracks. Thus, a user must scroll to view some of the tracks, but this will move other tracks out of the display. Once a particular number of tracks is exceeded, the application can no longer concurrently display all of the tracks in the display area. This can make it difficult for a user to accurately line up clips that are in tracks far apart. Thus, there is a need for a media editing application that allows a user to condense the media clips in a composite display area in one way or another.

SUMMARY OF THE INVENTION

Some embodiments of the invention provide a media editing application that allows a user to visually condense graphical representations of media clips that the application combines to create a composite media presentation. The media editing application of some embodiments includes a display area for displaying the composite presentation that the application creates by compositing several media clips (e.g., audio clips, video clips). The media editing application of some embodiments also includes a composite display area (e.g., an area with multiple tracks that span a timeline) for displaying the graphical representations of the media clips that are part of the composite presentation.

Each graphical representation is displayed in a particular row and spans a particular portion of the timeline. In some embodiments, the display of a graphical clip representation in a particular row indicates the assignment of the corresponding media clip to a track used when the application creates the composite presentation. To condense the graphical representations in the composite display area, the application of some embodiments includes a compression tool for causing the graphical representations to be moved together across the rows in order to reduce blank space in the composite display area. Alternatively or conjunctively, the application of some embodiments includes a collapsing tool for reducing the size of the graphical representations in the composite display area without moving the graphical representations from their assigned tracks.

To compress the clip representations, some embodiments identify new row assignments for the clip representations in the composite display area that do not necessarily indicate the assignment of the corresponding media clip to a particular data track. The compression tool then calculates speeds at which each clip representation should be moved from its initial row to its newly assigned row, and moves the clip representations to the newly assigned rows in unison.

In identifying the new row assignments, some embodiments attempt to move all of the clip representations towards a particular destination row (e.g., the top row or bottom row). For each particular clip representation, the compression tool identifies the row closest to the destination row to which the clip representation can be moved without moving past any other clip representations that span any portion of the timeline overlapping with the portion spanned by the particular clip representation. Thus, some clip representations that are initially assigned to the same row (and thus, whose corresponding media clips are assigned to the same track) may be moved to different rows depending on the presence of clip representations that overlap them in the timeline.

To calculate the speeds at which the clip representations should be moved, the compression tool of some embodiments identifies the relative distances that the different clip representations are to be moved and the amount of time over which the movement is to be displayed. The speeds are then calculated assuming that all of the clip representations should begin and end their movement at the same time. Thus, a clip representation that is moving three rows will move three times as fast as a clip representation that is moving one row in some embodiments. The media editing application then displays the movement of the clip representations to their newly assigned rows in the composite display area.

To collapse the clip representations in the composite display area, some embodiments shrink the size of the selected clip representations and the rows in which the selected clip representations are displayed in a direction orthogonal to the timeline. That is, if the timeline is displayed horizontally, the selected clip representations and rows are collapsed so as to take up less vertical space in the composite display area. This enables more rows to be displayed in the composite display area at one time. Unlike the compression tool, the collapsing tool maintains the association of a clip representation with the track to which the corresponding media clip is assigned.

Some embodiments allow a user to apply the compression tool or collapsing tool (collectively, the condensing tools) to only a subset of the clip representations in the composite display area. Some embodiments arrange the clip representations into groups and sub-groups (and sub-groups of sub-groups, etc.) and enable a user to select one or more groups before applying one of the condensing tools. In some embodiments, each row in the composite display area is assigned to a particular group and/or sub-group, and all of the clips in a particular row are in the particular row's group and/or sub-group. When one of the condensing tools is applied with a particular group or sub-group selected, some embodiments only apply the features of that condensing tool to the clip representations in the particular group or sub-group.

BRIEF DESCRIPTION OF THE DRAWINGS

The novel features of the invention are set forth in the appended claims. However, for purpose of explanation, several embodiments of the invention are set forth in the following figures.

FIGS. 10-12 illustrate the selection of a sub-group and the application of an expansion tool to the selected sub-group.

DETAILED DESCRIPTION OF THE INVENTION

In the following description, numerous details are set forth for purposes of explanation. However, one of ordinary skill in the art will realize that the invention may be practiced without the use of these specific details. For instance, many of the examples below display a timeline running horizontally with tracks or rows stacked on top of each other vertically. One of ordinary skill will recognize that a timeline could be displayed vertically and tracks or columns then lined up next to each other horizontally.

Some embodiments provide a media-editing application for creating a multimedia presentation (e.g., a movie) by compositing several multimedia clips (e.g., audio clips, video clips, etc.). The media-editing application of some embodiments provides (1) a composite display area for displaying a set of clip shapes representing a set of multimedia clips that are part of the composite presentation and (2) one or more condensing tools (i.e., a compression tool and/or a collapsing tool) for visually condensing the clip shapes in the composite display area. In some embodiments, the set of clip shapes are arranged into different groups and sub-groups in the composite display area and the condensing tools can be applied to one or more groups of clip shapes rather than the entire set of clip shapes.

Figure 1:
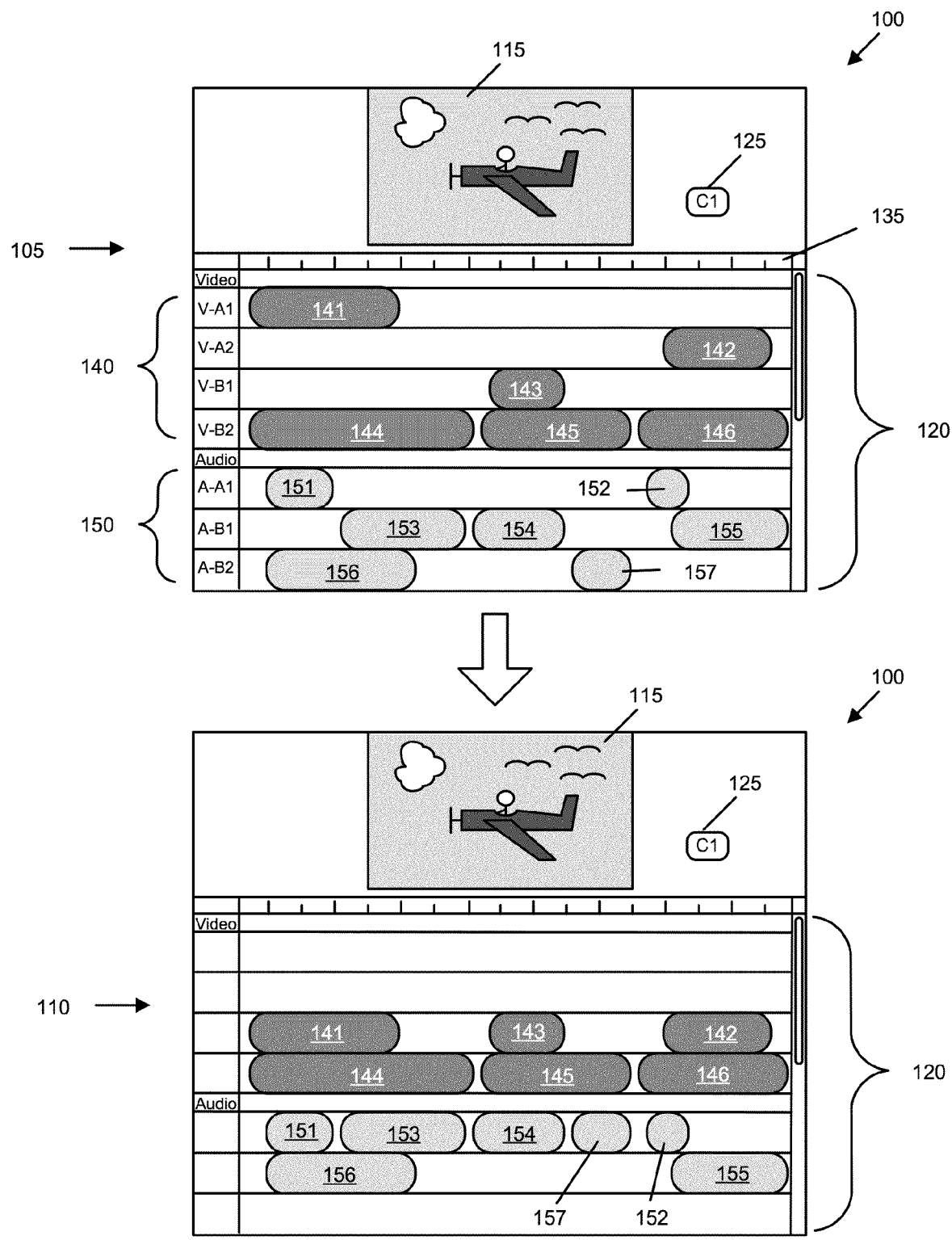
FIG. 1 illustrates the application of a compression tool of some embodiments to a graphical user interface of a media editing application.

For some embodiments of the invention, FIG. 1 illustrates a graphical user interface ("GUI") 100 of a media editing application with such a compression tool. Specifically, FIG. 1 illustrates the GUI at two different stages, a first stage 105 before the application of the compression tool and a second stage 110 after the application of the compression tool.

As shown in FIG. 1, the GUI 100 includes a preview display area 115, a composite display area 120, and a compression UI item 125. The preview display area 115 displays a preview of a composite presentation that the application creates by compositing several media clips. The composite display area 120 provides a visual representation of the composite presentation being created by the user. Specifically, it displays one or more clip shapes representing one or more media clips that are part of the composite presentation.

Composite display area 120 is an area that includes seven rows that span a timeline 135. In some embodiments, the timeline 135 indicates the time during the composite presentation that particular media clips will be presented within the presentation. Each of the seven rows includes a label that indicates a track with which the media clips represented in a particular row are associated. Each row is associated with a particular set of vertical coordinates. The seven rows are assigned to two groups, a video group 140 and an audio group 150. Each of the groups includes two sub-groups. Video sub-group A includes clip shapes 141 and 142 while video sub-group B includes clip shapes 143-146. Audio sub-group A includes clip shapes 151 and 152 while audio sub-group B includes clip shapes 153-157. In this example, the video and audio groups are indicated by group headers while the sub-groups are indicated in the track labels (e.g., "V-A1" indicates video sub-group A).

The compression UI item 125 is a conceptual illustration of one or more UI items that causes the media editing application to implement its compression feature for moving the clip shapes together across the rows in order to reduce blank space in the composite display area. Different embodiments of the invention implement the compression item differently. Some embodiments implement it as a UI button, others as a command that can be selected in a pull-down, drop-down, or other type of menu, and still others as a command invoked through one or more keystroke operations. Yet other embodiments allow the user to access the compression feature through multiple different UI items.

The operation of the compression feature will now be described by reference to the GUI during the two stages 105 and 110 illustrated in FIG. 1. In the first stage 105, the composite display area 120 displays a graphical representation of a portion of a composite presentation that includes the several clip shapes described above along the timeline 135. A user could have added these clip shapes to the composite display area in order to define the composite presentation in a current editing session or the user could have opened a composite project defined in a previous editing session. In the first stage, each clip shape is displayed in a row that indicates the assignment of the corresponding media clip to a track used when the application creates the composite presentation.

The second stage 110 illustrates the result of a user selecting the compression UI item 125 to cause the application to compress the clip shapes in the composite display area. When the compression feature is applied, the application moves the clips together in order to reduce blank space in the composite display area. In some embodiments, when there are two or more groups of media clips, compression is applied to each of the groups separately, as shown. In the case illustrated in FIG. 1, the upper group (video) is compressed downwards while the lower group (audio) is compressed upwards. Other embodiments implement the compression differently. For instance, some embodiments compress all of the clip shapes in one direction (e.g., towards the top of the composite display area). Some such embodiments compress each group of clip shapes separately in the same direction while other embodiments compress all of the clip shapes together.

The particular application of the compression feature illustrated in FIG. 1 causes video clip shapes 141 and 142 to move downwards such that they are on the same row as clip shape 143. Similarly, audio clip shapes 153, 154, and 157 are moved upwards onto the same row as clip shapes 151 and 152, while clip shape 156 is moved upwards onto the same row as clip shape 155. While the compression process does not modify the location of a clip shape with reference to the timeline (i.e., the horizontal direction in GUI 100), it does disassociate the rows from the track assignments, in that two clip shapes whose corresponding media clips are assigned to the same track may be on the same row. Doing so does not mean that the corresponding media clip is actually assigned to a different track (e.g., the media clip corresponding to clip shape 141 is still assigned to video track A1, not to track B1). Accordingly, some embodiments no longer display the track names as labels, as shown. Some such embodiments also remove the track lines from the composite display area as well. Other embodiments, however, keep the track names and display the track lines as moving up and down in the composite display area with the clip shapes. For example, in such embodiments, the track line between V-A1 and V-A2 would diagonal downwards sharply, run below clip 141, then diagonal upwards to run above clips 143 and 142. Different applications of the compression tools of some embodiments will be described in greater detail below in Section III and IV.

Figure 2:
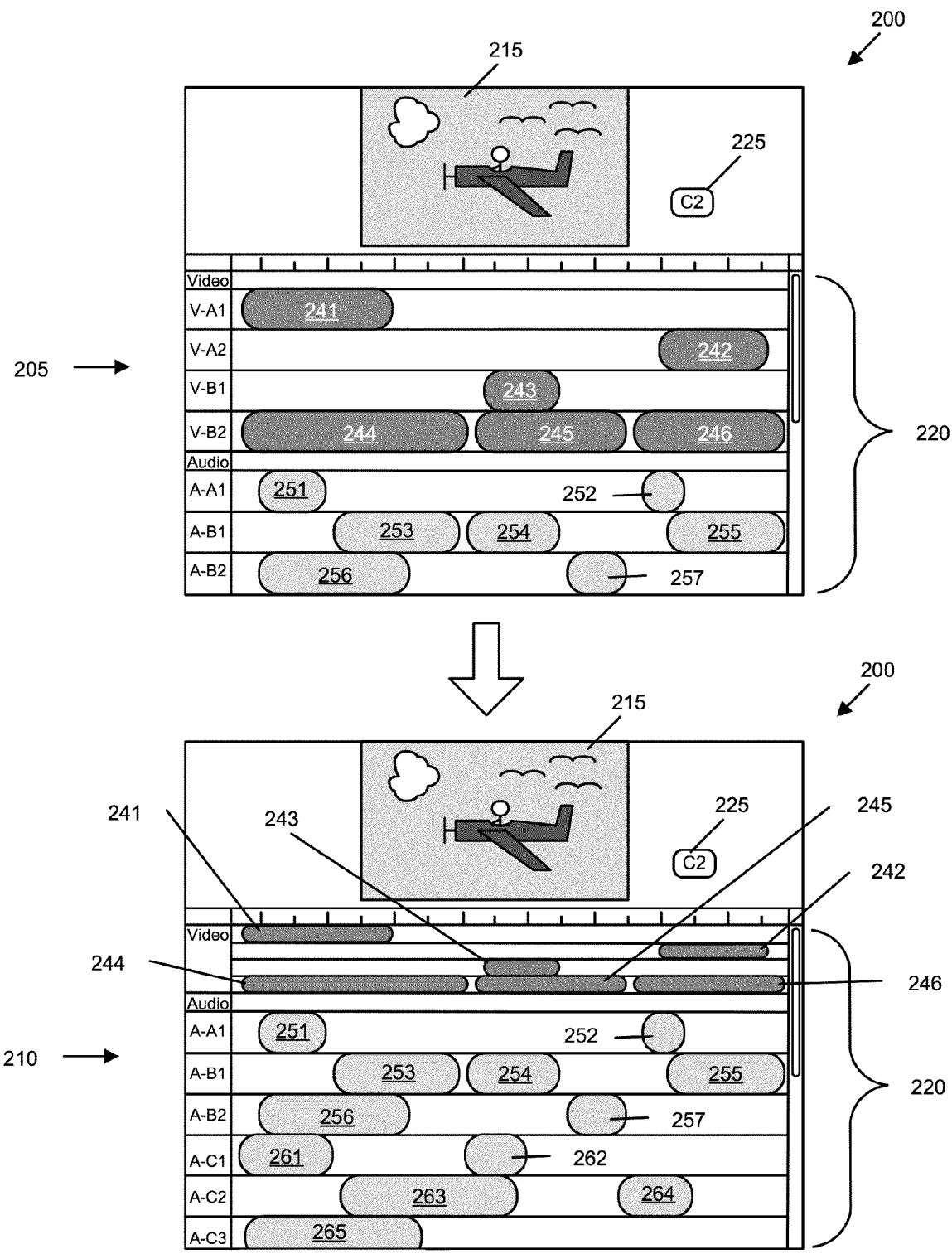
FIG. 2 illustrates the application of a collapsing tool of some embodiments to a graphical user interface of a media editing application.

As mentioned above, in addition to or in place of a compression tool, some embodiments include a collapsing tool. FIG. 2 illustrates a GUI 200 of a media editing application of some embodiments with such a collapsing tool. Specifically, FIG. 2 illustrates the GUI at two different stages, a first stage 205 before the application of the collapsing tool and a second stage 210 after the application of the collapsing tool.

Like the GUI 100 of FIG. 1, the GUI 200 of FIG. 2 includes a preview display area 215 and a composite display area 220. GUI 200 also includes a collapsing UI item 225. The composite display area 220 is arranged similarly, with video clips 241-246 split into two subgroups and audio clips 251-257 split into two subgroups. The clip shapes are displayed along rows 230 that span a timeline 235.

The collapsing UI item 225 is a conceptual illustration of one or more UI items that causes the media editing application to implement its collapsing feature for reducing the size of the clip shapes. Different embodiments of the invention implement the collapsing UI item differently. Some embodiments implement it as a UI button, others as a command that can be selected in a pull-down, drop-down, or other type of menu, and still others as a command invoked through one or more keystroke operations. Yet other embodiments allow the user to access the collapsing feature through multiple different UI items.

In the first stage 205 of FIG. 2, the composite display area displays a graphical representation of a portion of a composite presentation that includes the several clip shapes described above along the timeline 235. Each clip shape is displayed in a row that indicates the assignment of the corresponding media clip to a track used when the application creates the composite presentation.

The second stage illustrates the result of a user selecting the collapsing UI item 225 to cause the application to collapse the video clip shapes. The collapsing feature of some embodiments may be applied to either groups or sub-groups in order to de-emphasize those groups or sub-groups. In the particular case shown in FIG. 2, the entire video group is collapsed.

In some embodiments, collapsing a group of clip shapes entails reducing the size of the clip shapes in the direction orthogonal to the timeline. In this case, the clip shapes are reduced in size vertically because the timeline is in the horizontal direction. This way, a user can still easily recognize the portion of the timeline spanned by each clip shape. The collapsing feature of some embodiments also leaves each clip shape in the same row that it was in prior to the application of the feature. As such, the rows maintain their association with particular tracks upon the application of the collapsing feature. However, some embodiments no longer display the track names, as shown in stage 210. Reducing the size of some of the clip shapes provides more space in the composite display area for other clip shapes. As shown, collapsing the video group reveals that there are more audio clip shapes 261-265 in a third audio sub-group.

In the examples described above, both the compression and collapsing features are shown as applied to groups of clips in a composite display area. One of ordinary skill in the art will recognize that some embodiments include these condensing tools without grouping the clip shapes in the composite display area. Thus, some embodiments apply the compression feature to move together all of the clip shapes in the composite display area, or apply the collapsing feature to reduce the size of all of the clip shapes in the composite display area.

Further details regarding the media-editing application of some embodiments are described in the following Section I. This section also includes details on the grouping feature of some such applications. Section II then describes the collapsing feature of some embodiments, as well as an expansion feature. Section III follows this with further details about the compression feature of some embodiments. Section IV elaborates on the row assignment aspect of the compression process. Section V then describes the software architecture of some embodiments of the media-editing application and Section VI provides a description of one computer system with which some embodiments of the invention are implemented.

I. Media-Editing Application

Figure 3:
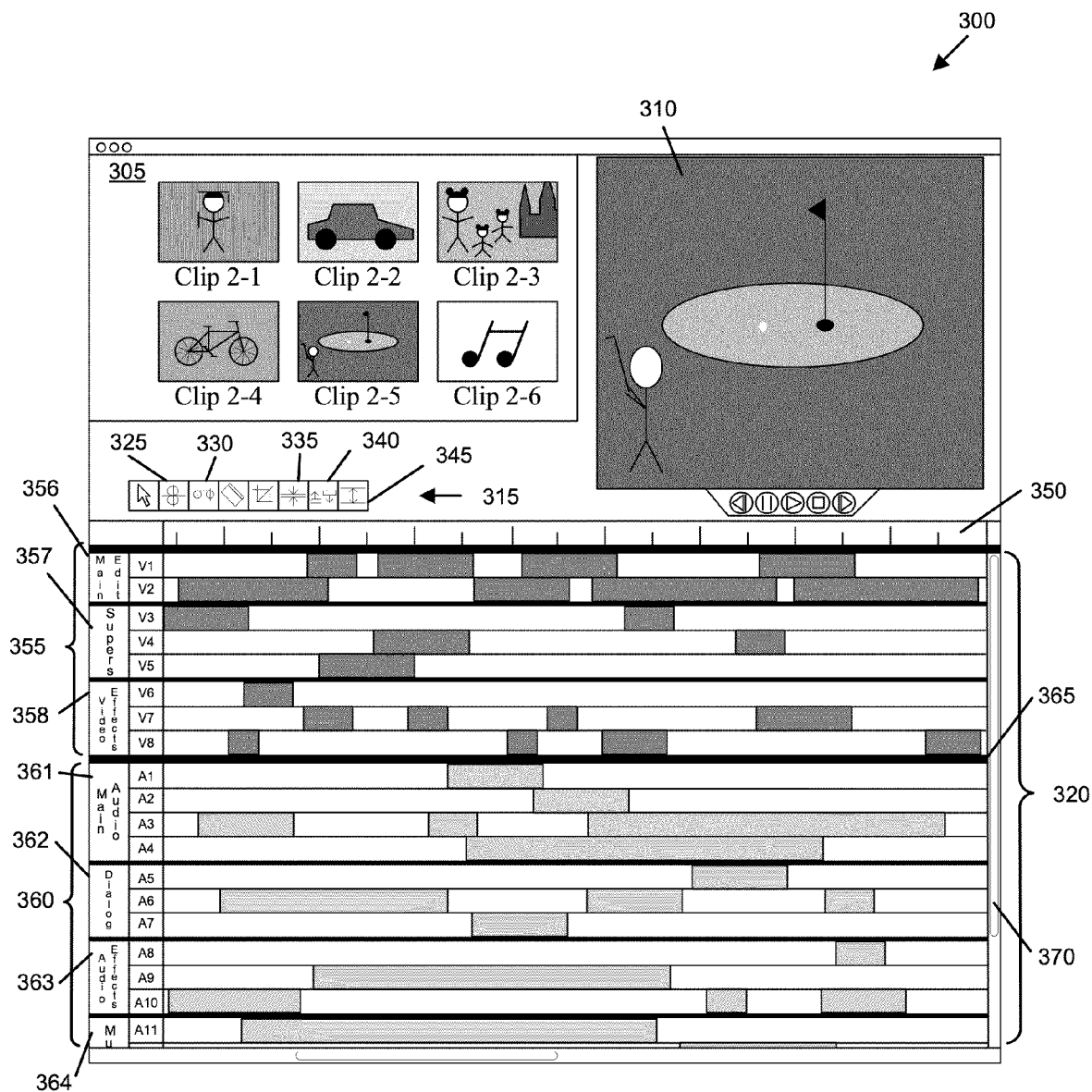
FIG. 3 illustrates a graphical user interface of a media-editing application of some embodiments.

As mentioned above, some embodiments of the invention provide a media-editing application that includes various tools for visually condensing graphical representations of media clips used to create a composite media presentation. FIG. 3 illustrates a graphical user interface (GUI) 300 of such a media-editing application. The GUI 300 includes a media library 305, a preview display area 310, a set of tools 315, and a composite display area 320.

The media library 305 is a region in the GUI that includes a group of selectable media clips. A user can select a media clip in order to add the media clip or a portion of the media clip to the media presentation that the user is compositing with the application. In some embodiments, as shown, the media clips are represented as thumbnails that can be selected and added to the composite display area 320 (e.g., through a drag-and-drop operation or a menu selection operation). In some embodiments, the media library may include video clips, audio clips, text overlays, pictures, or other media.

The preview display area 310, as mentioned above, displays a preview of the composite presentation that the application creates by compositing the media clips added by the user. As shown, some embodiments include various video player tools, such as a play button, pause button, fast forward, rewind, etc. in order to further aid the user in viewing the preview of the media presentation.

The set of tools 315 is representative of various selectable tools present in the media editing application of some embodiments. In some embodiments, the set of tools includes various media editing tools. For instance, set of tools 315 includes a roll tool 325 and a slip tool 330 for performing various types of trim edits on the clips in the composite display area. Some embodiments include other editing tools as well, such as a slide tool, ripple tool, blade tool, etc. The set of tools 315 also includes various tools for affecting the display of the composite display area, such as collapsing tool 335, compression tool 340, and expansion tool 345. The operation of these tools will be described in detail in the sections that follow.

The composite display area 320 provides a visual representation of the composite presentation being created by the user. Specifically, it displays one or more geometric shapes that represent media clips (i.e., clip shapes) that are part of the composite presentation. Composite display area 320 includes timeline 350 for indicating the time within the media presentation to which horizontal positions in the composite display area correspond. Each particular media clip is placed on a particular row in the composite display area and spans a particular portion of the timeline in some embodiments. Each row spans a particular set of y-coordinates.

In some embodiments, each row is associated with a track that is used by the editing application to create the composite presentation. Different tracks are used differently in some embodiments. For example, some embodiments will use all audio tracks at once. On the other hand, if there is more than one primary video track, some embodiments have a hierarchy of which video track supersedes the other(s). That is, if there is a first clip assigned to a first video track at a particular time and a second clip assigned to a second video track at the particular time, some embodiments will only incorporate one of the clips into the media presentation for that particular time.

In some embodiments, as shown, the clip shapes in the composite display area are arranged down into groups. For instance, some embodiments group the clip shapes based on the type of media. The clip shapes in composite display area 320 are arranged into two primary groups, each of which has multiple subgroups. The video group 355 includes sub-groups main edit 356, supers 357, and video effects 358. The audio group 360 includes sub-groups main audio 361, dialog 362, audio effects 363, and music 364. In the example shown, there are no labels for the two groups 355 and 360, but they are separated by the thick line 365. The track labels in each group also begin with a "V" for the video tracks and an "A" for the audio tracks. The sub-groups, on the other hand, each have a label off to the left side to indicate which tracks belong to which sub-group.

The groups and sub-groups shown in composite display area 320 are merely one example of the groups and sub-groups that could be provided in a media-editing application. Some embodiments of the media-editing application have default group and sub-group settings that are automatically provided to a user In some embodiments, a user can also define new groups and sub-groups or delete groups and sub-groups by using various user interface tools.

In some embodiments, some of the tools 315 can be applied to individual groups and/or sub-groups as well as to the entire composite display area. For instance, some embodiments allow a user to select one or more sub-groups and then apply one of the UI tools 335, 340, or 345 to affect only the tracks and clip shapes in the selected group.

Different groups can have different numbers of tracks, and thus have different numbers of rows in the composite display area. In the example shown in FIG. 3, the main edit sub-group 356 only has two tracks, whereas the main audio sub-group 361 has four tracks. In some embodiments, the number of tracks in any particular sub-group is not limited. As more tracks are added to the media presentation, a smaller percentage of the total rows will be visible at any one time in the composite display area. In GUI 300, not all of the rows can be displayed at one time in composite display area 320, as at least one row in the music sub-group 364 is cut off. A user can use scrollbar 370, or a similar UI item, to scroll down to see the bottom rows in the composite display area.

In some embodiments, the media-editing application keeps track of the entire composite media presentation, including that which is not presently displayed in the composite display area, via a composite presentation window. Each clip shape is assigned a location in the composite presentation window that spans x-coordinates (on the timeline) and y-coordinates (row assignment and display size for the row). The composite display area displayed in the GUI is then a portion of this overall composite presentation window that is defined by a span of x-coordinates and y-coordinates.

Figure 4:
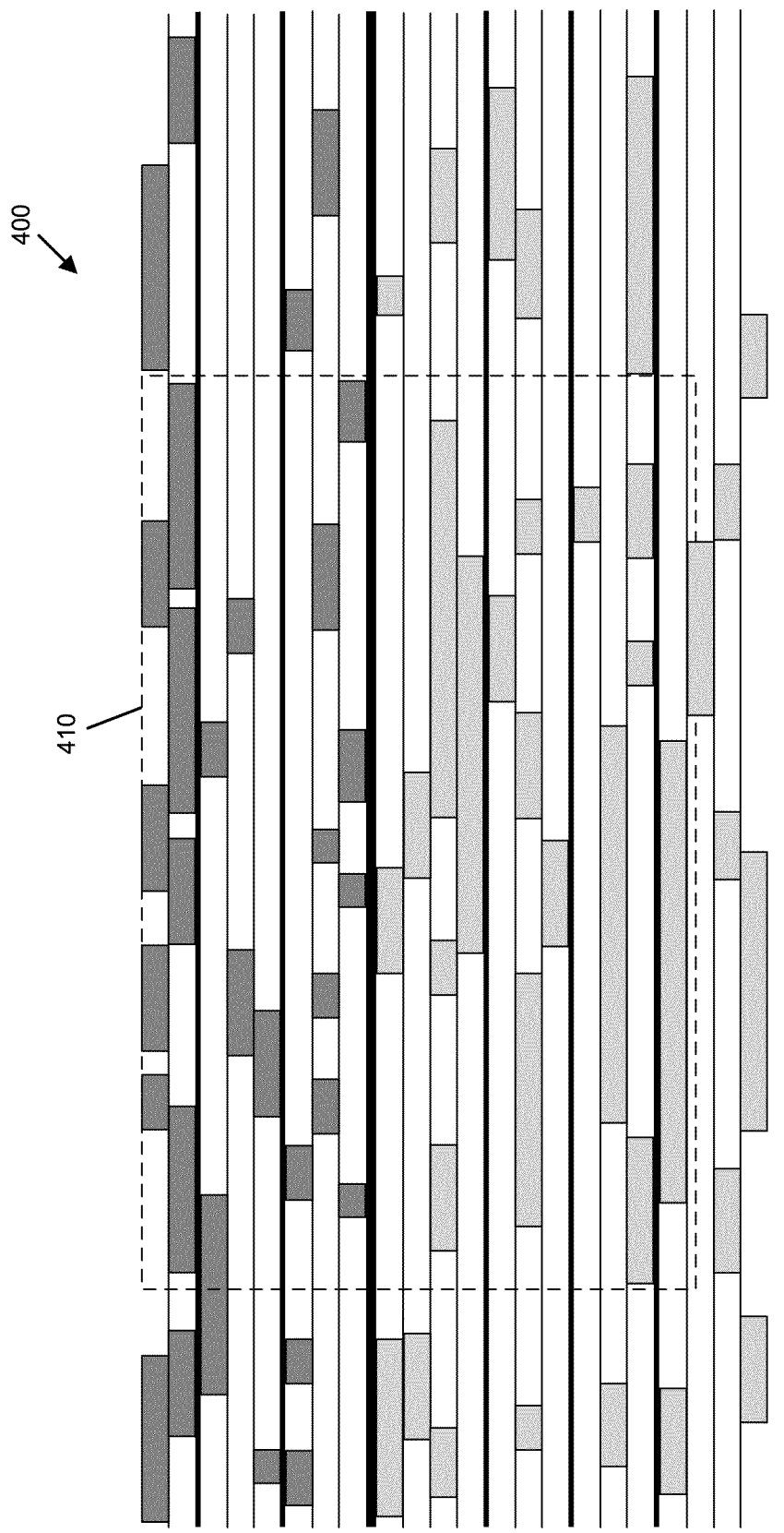
FIG. 4 illustrates a composite presentation window that shows the entirety of a media presentation.

FIG. 4 illustrates a complete composite presentation window 400 that shows the entirety of the media presentation from FIG. 3. FIG. 4 also illustrates window 410 as a dashed line that indicates the portion of the presentation window 400 that is presently displayed in composite display area 320. Moving the scrollbars in the GUI 300 will correspondingly move window 410, thereby changing what is displayed in composite display area 320. The following sections also present various methods to modify how much of the overall presentation can be viewed at one time in the composite display area.

II. Collapsing and Expanding Clip Shapes

Figure 5:
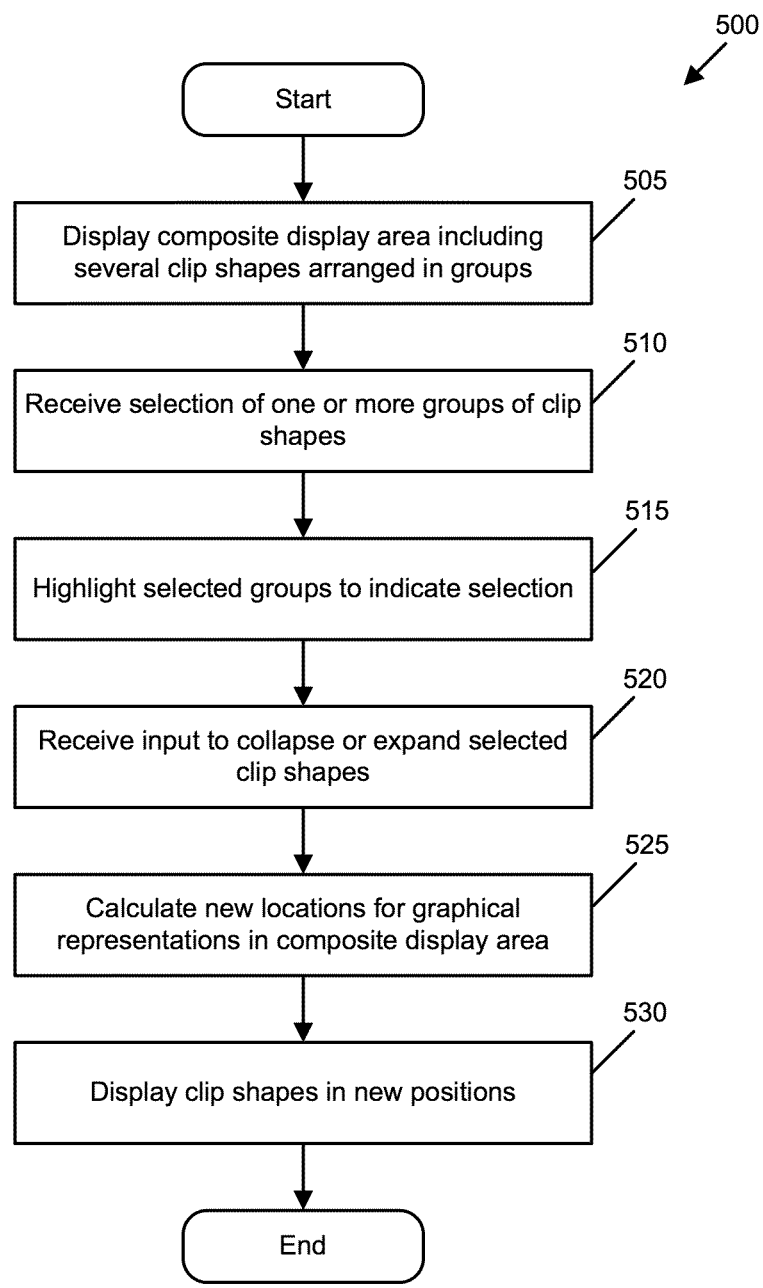
FIG. 5 conceptually illustrates a process of some embodiments for modifying the vertical size of clip shapes in one or more groups.

As described above, some embodiments provide UI tools for collapsing and/or expanding clip shapes. In some embodiments, these collapsing and expanding features can be applied to different groups and/or sub-groups in the composite display area. FIG. 5 conceptually illustrates a process 500 of some embodiments for modifying the vertical size of clip shapes in one or more groups. Process 500 will be described by reference to FIG. 6-12.

FIGS. 6-12 illustrate a GUI 600 for a media-editing application. Similar to the GUI 300 of FIG. 3, GUI 600 includes a media library 605, a preview display area 610, and a composite display area 615. GUI 600 also includes a collapsing tool 620 and an expansion tool 625.

As shown in FIG. 5, process 500 begins by displaying (at 505) a composite display area that includes several clip shapes arranged in groups. Composite display area 615 of GUI 600 is an example of such a composite display area. Like GUI 300, GUI 600 includes two primary groups of tracks (video and audio) that are arranged into seven sub-groups (three video sub-groups and four audio sub-groups).

The process next receives (at 505) a selection of one or more groups of clip shapes. In some embodiments, a selection of a group selects the rows of the group, which in turn each include a set of clip shapes. In some embodiments, a user moves a cursor over the group label, then presses and releases a selection button on a cursor controller (e.g., a left mouse button) in order to select a group. In some embodiments, a user touches a touchscreen where the group label is displayed in order to select a group. Other selection mechanisms, such as using keyboard input, are possible as well. Some embodiments include a checkbox or similar UI feature for each group that a user can check or uncheck to select or deselect a group.

The process then highlights (at 515) the selected groups in order to indicate this selection. Some embodiments highlight the group label and some embodiments highlight the labels of each of the rows in the selected group (i.e., the track names). Other areas may be highlighted as well in order to convey to the user that a particular group is selected. The highlighting can be a change in color, a pattern displayed over the highlighted portion, or some other visual mechanism.

Figure 7:
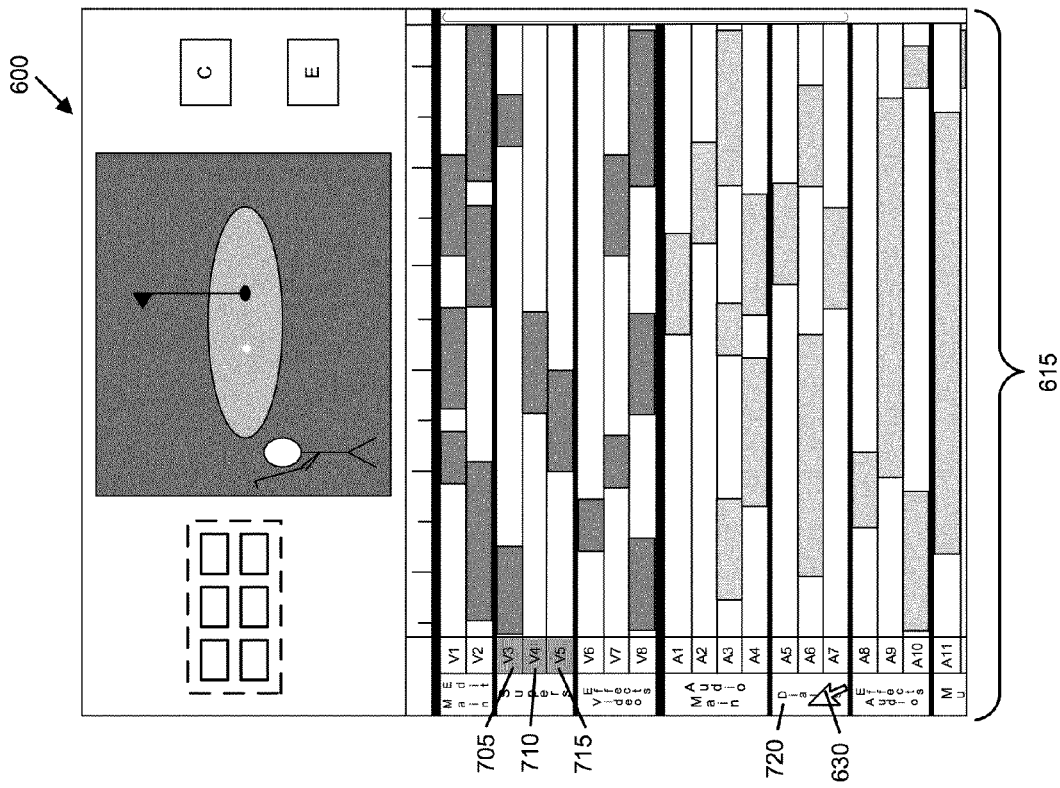
FIGS. 6-9 illustrate the selection of two sub-groups within a composite display area of a media-editing application and the application of a collapsing tool to the selected sub-groups according to some embodiments.
Figure 6:
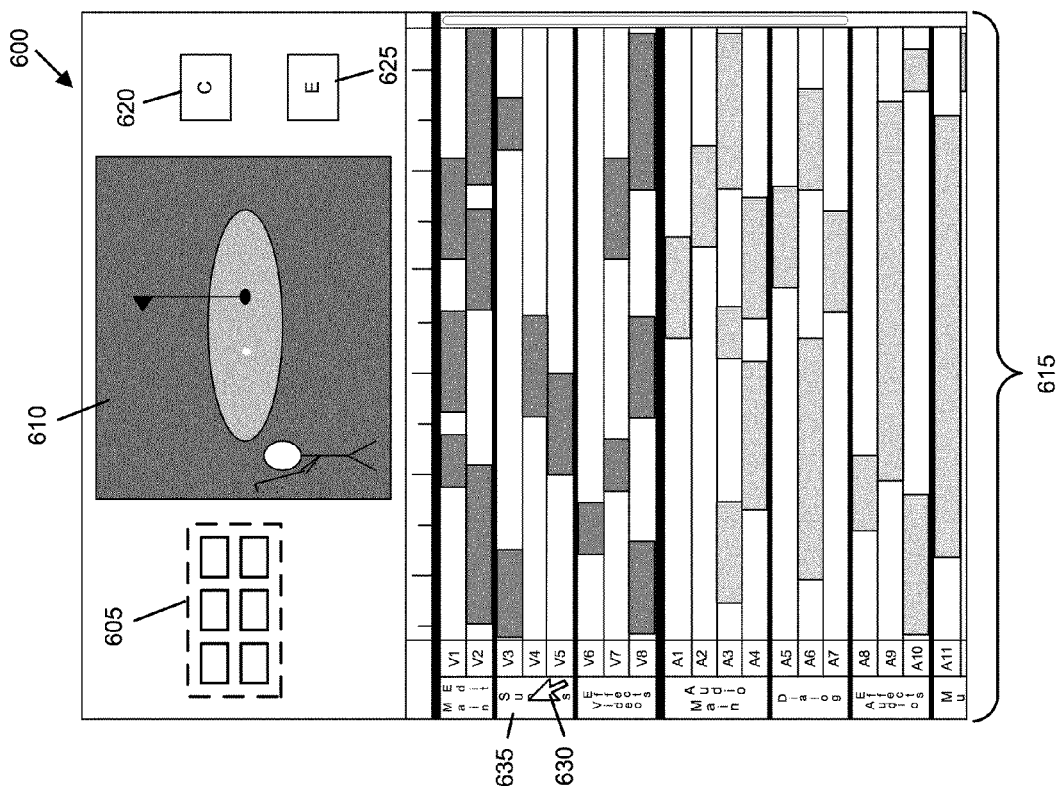
Figure 8:
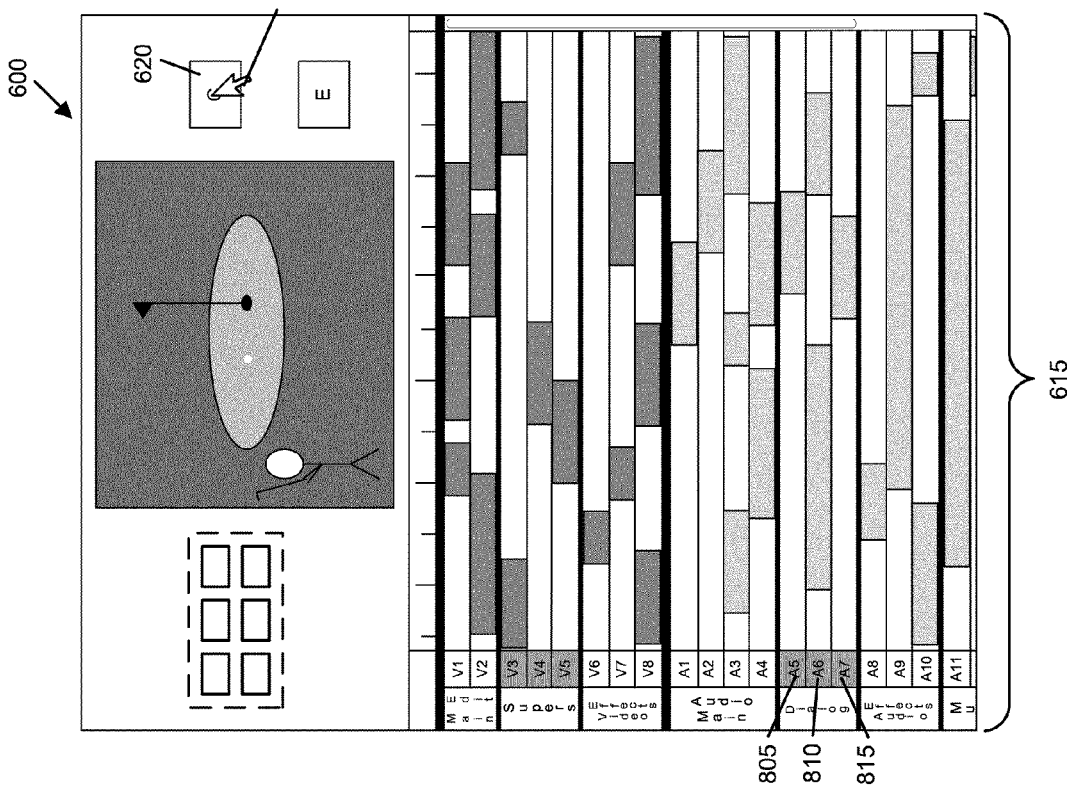

FIGS. 6-8 illustrate the selection of two sub-groups within the composite display area 615. In addition to the features of the GUI 600 that are mentioned above, these figures illustrate a cursor 630. In FIG. 6, cursor 630 is displayed over the label for the supers video sub-group 635.

FIG. 7 illustrates the result of user interaction to select the supers sub-group 635 (e.g., the user pressing and releasing a mouse button with the cursor in the location shown in FIG. 6). The labels for the three rows in the supers sub-group, rows 705, 710, and 715 (V3, V4, and V5), are now highlighted. In the example shown, only the row labels are highlighted and not the group label itself. In some embodiments, a user can also select individual rows, or select a group and then deselect one of the individual rows by pressing and releasing a mouse button with the cursor over the row label (or similar input).

FIG. 7 also illustrates the cursor 630 over the label for the dialog audio sub-group 720. FIG. 8 illustrates the GUI 600 after user interaction to select the dialog sub-group 720. The labels for the three rows in the dialog audio sub-group, rows 805, 810, and 815 (A5, A6, and A7) are now highlighted.

Returning to FIG. 5, process 500 next receives (at 520) input to collapse or expand the selected clip shapes. In some embodiments, these options are provided as user interface items such as items 620 and 625. The items may be selectable UI buttons, commands in a pull-down, drop-down, or other type of menu, or other types of UI items. In some embodiments, the options may also be invoked by keyboard input.

After receiving input to collapse or expand the selected clip shapes, the process calculates (at 525) new locations for the clip shapes in the composite display area. In some embodiments, this entails calculating new locations in the composite presentation window (such as composite presentation window 400 of FIG. 4). Once the new locations in the composite presentation window are calculated for the clip shapes, then the new locations in the displayed composite display area are only a matter of determining what is within the display window (e.g., window 410).

The new locations for the clip shapes are due to the changing in size of the clip shapes. In some embodiments, the collapsing tool causes the selected clip shapes to be reduced in size vertically and the expansion tool causes the selected clip shapes to be enlarged in size vertically. This means that the rows to which the selected clip shapes are assigned must be reduced or enlarged in size vertically, and the rows above and/or below must move accordingly.

Figure 9:
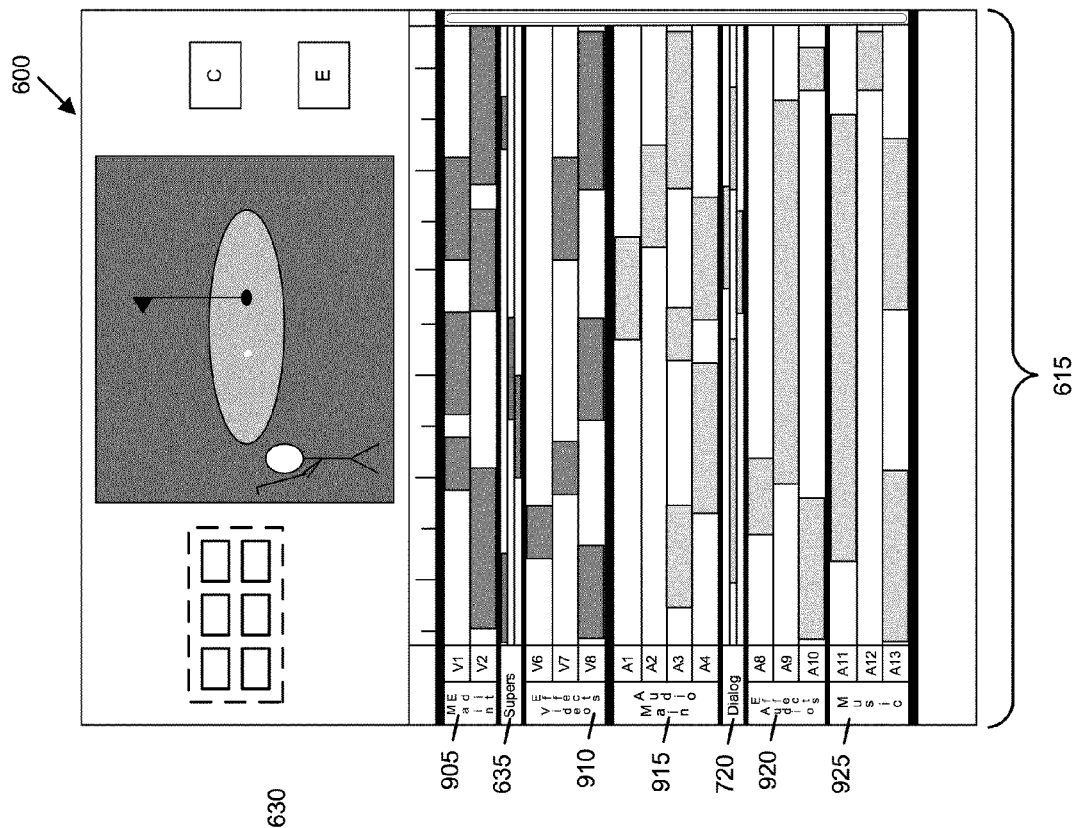

After calculating the new positions, the process displays (at 530) the clip shapes in their new positions, and then ends. FIGS. 8 and 9 illustrate the collapsing feature as applied to the two selected groups, supers video sub-group 635 and dialog audio sub-group 720. In FIG. 8, with the two groups selected, the user has moved the cursor 630 over collapsing tool 620.

FIG. 9 illustrates the result of the user selecting the application of collapsing tool 620. The clip shapes in the supers sub-group 635 and dialog sub-group 720 have been reduced in size vertically by a factor of approximately one-fourth along with the row height for the rows in these sub-groups. Although the clip shapes reduce in size vertically, the row assignments of the clip shapes are not lost because the rows are reduced in size correspondingly. Thus, the clip shapes are still displayed in a row that corresponds to the track to which the clip shapes' corresponding media clips are assigned. Furthermore, because the size of the clip shapes horizontally is not affected, the association of each clip shape with a particular portion of the timeline is not lost. In fact, in some embodiments, the user may still perform editing operations on the collapsed clip shapes, although doing so with precision may be more difficult due to the reduced size. As shown, however, some embodiments remove the row labels upon collapsing the clip shapes due to the reduced size. In fact, some embodiments change the orientation of the group label from vertical (as in FIG. 8) to horizontal (as in FIG. 9), and remove the boundary between the group label and the row labels.

In order to change from the display in FIG. 8 to the display in FIG. 9, the editing application must calculate the new locations of all of the clip shapes. In embodiments that begin at the top of the composite display area and work downwards, the clip shapes in the main edit sub-group 905 are not affected at all, because they are above the first collapsed sub-group. However, new vertical spans for each of the clip shapes in the supers sub-group 635 must be calculated based on the reduction factor. In turn, clip shapes in the video effects sub-group 910 and main audio sub-group 920 are moved upwards now that the size of the clip shapes above is reduced. Calculations for the dialog sub-group 720 must factor in moving the group upwards due to the reduction in size of the supers sub-group as well as the reduction in size of the dialog sub-group itself. The positions of the clip shapes in audio effects sub-group 920 and music sub-group 925 can then be calculated, accounting for the reduction in size of both of the collapsed sub-groups.

In FIG. 9, all of the tracks of the composite presentation now fit in the composite display area 615 concurrently, due to the collapsing of the two selected sub-groups. The composite display area still only shows a portion of the span of the timeline, as the horizontal axis is not affected by the collapsing feature.

Figure 12:
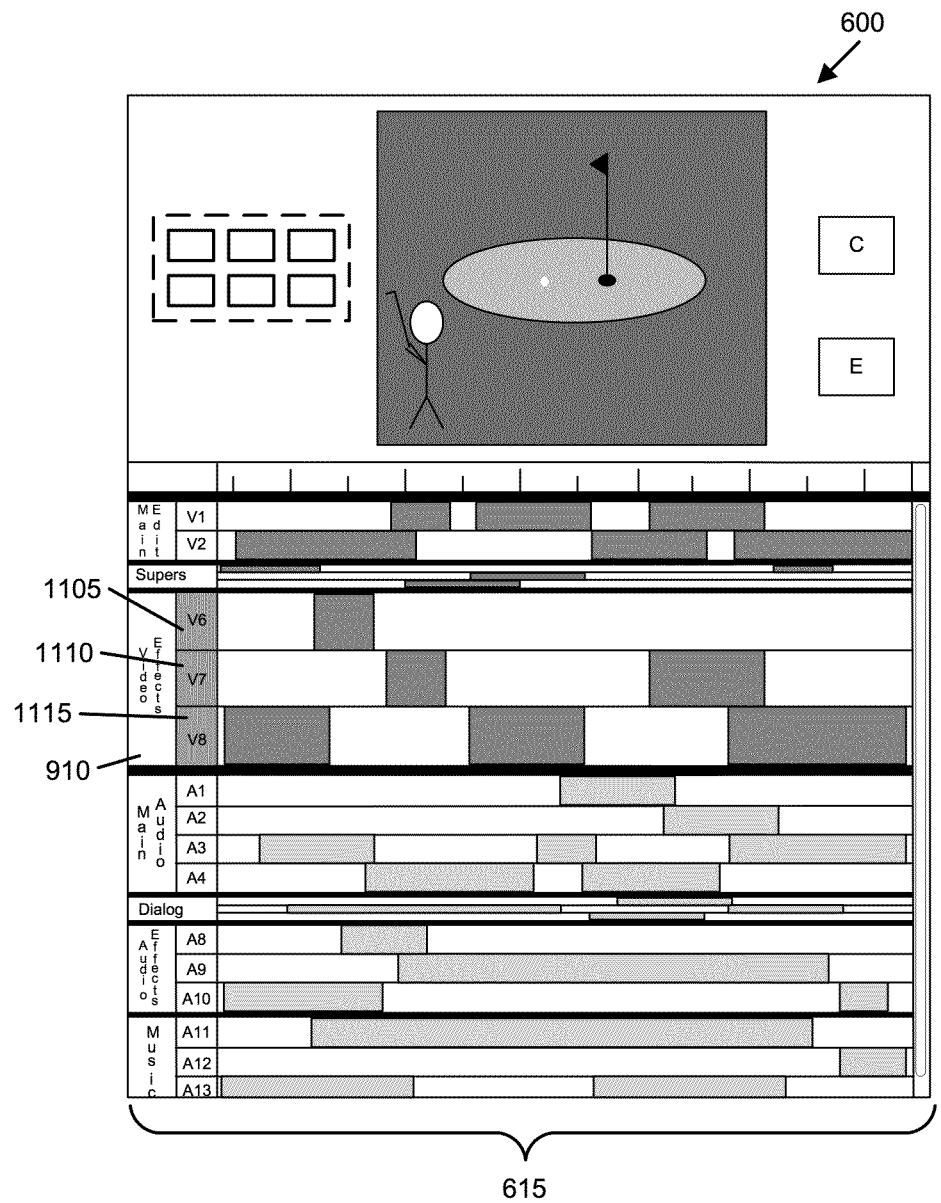

FIGS. 10-12 illustrate the expansion feature of some embodiments. FIG. 10 illustrates the GUI 600 as shown in FIG. 9, after the application of the collapsing feature to sub-groups 635 and 720. FIG. 10 also illustrates cursor 630 over video effects sub-group 910. FIG. 11 illustrates the GUI 600 after user interaction to select the video effects sub-group 910. The labels for the three rows in the video effects sub-group, rows 1105, 1110, and 1115 (V6, V7, and V8) are now highlighted.

FIG. 11 also illustrates the cursor 630 over the expansion tool 625. FIG. 12 illustrates the result of the user selecting the application of the expansion tool 625. The clip shapes in video effects sub-group 910 have been enlarged in size vertically by a factor of approximately two along with the row heights for the three rows 1105, 1110, and 1115. Although the clip shapes expand in size vertically, the row assignments of the clip shapes are not lost because the rows are enlarged in size correspondingly. Thus, the clip shapes are still displayed in a row that corresponds to the track to which the clip shapes' corresponding media clips are assigned. Furthermore, because the size of the clip shapes horizontally is not affected, the association of each clip shape with a particular portion of the timeline is not lost. A user that wishes to only edit clip shapes in one particular group may expand that particular group in order to more precisely perform the desired editing operations. In some embodiments, as shown, expansion does not affect the row or group labeling.

Like the application of the collapsing tool, the editing application must calculate new locations of all the clip shapes when the expansion tool is applied. The clip shapes in the main edit sub-group 905 and supers sub-group 635 are not affected, because they are displayed above the video effects sub-group and have nowhere to move. New vertical spans for each of the clip shapes in the video effects sub-group must be calculated based on the enlargement factor. The positions of the clips shapes for the remainder of the sub-groups can then be calculated, accounting for the expansion of the video effects clip shapes.

In displaying the clip shapes in their new positions, some embodiments animate the movement of the clip shapes in the composite display area. For instance, some embodiments calculate the new positions, then determine how fast each of the shapes has to move or change size in order to go from its initial position to final position. These speeds are then calculated in such a way that the animation appears smooth (i.e., as the clip shapes of the selected group are changing in size, the shapes underneath them are moving along in unison). In other embodiments, however, there is no animation between the initial position and the final position. Instead, the shapes are displayed at the final position immediately after the selection of the collapsing or expansion tool.

The collapsing and expansion tools provide users with the ability to de-emphasize or emphasize groups of clip shapes. Furthermore, the collapsing tool enables more of the desired groups of clip shapes to be viewable in the composite display area concurrently. If a user wanted to edit, for example, the music sub-group 925 while viewing the clip shapes in the main edit sub-group 905 (e.g., to line up music with the desired video), the user could collapse the clip shapes in all of the five groups in between those two groups.

III. Compressing Clip Shapes in the Composite Display Area

As noted above, the collapsing tool is one type of composite display area condensing tool provided by the media-editing application of some embodiments. Alternatively or conjunctively, some embodiments provide a compression tool that reduces blank space in the composite display area by moving clip shapes together. This also results in the condensing of the clip shapes in the composite display area, such that more of the clip shapes are displayed at once in the composite display area.

Figure 13:
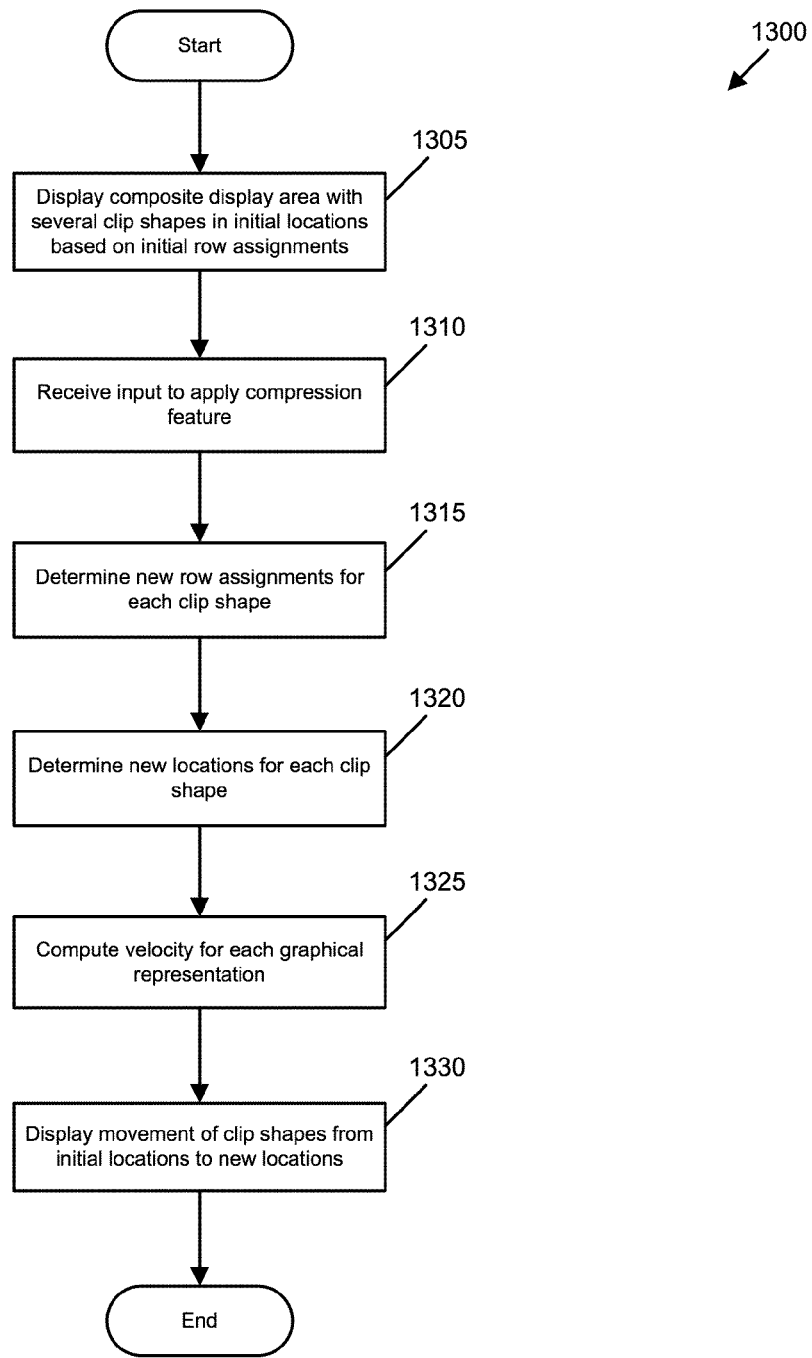
FIG. 13 conceptually illustrates a process of some embodiments for applying a compression feature
Figure 15:
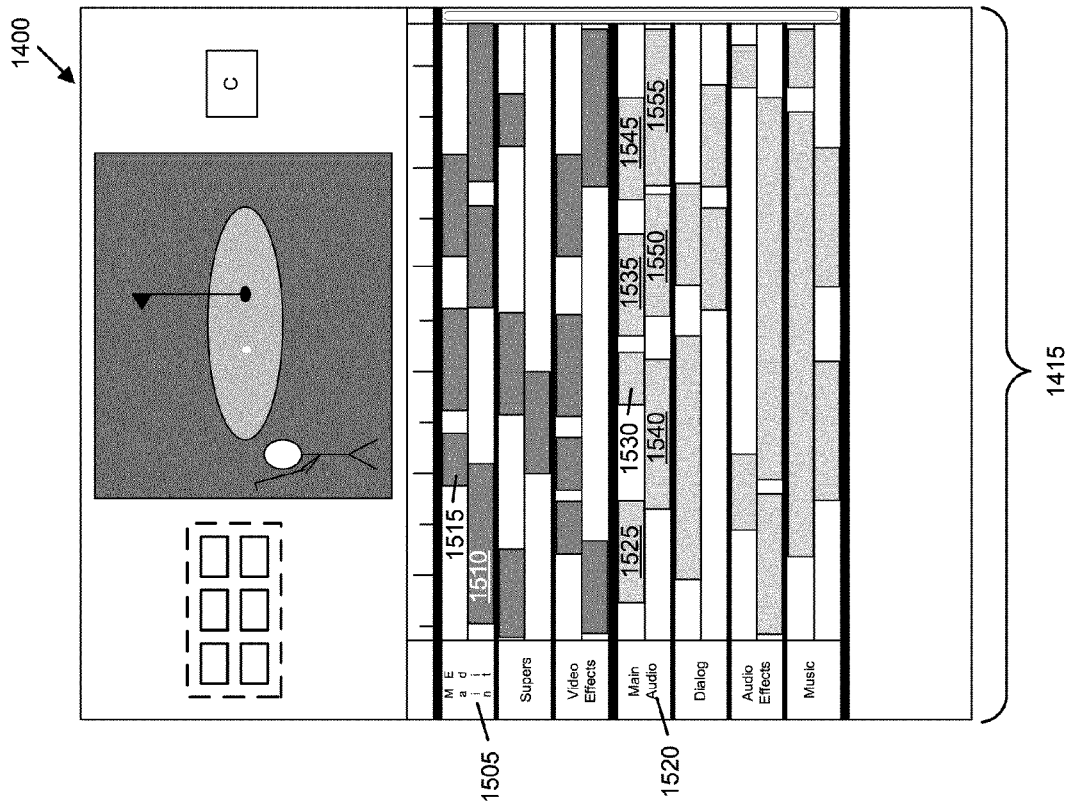
FIGS. 14 and 15 illustrate the application of a compression feature of some embodiments to clip shapes in sub-groups within a composite display area of a media-editing application.
Figure 14:
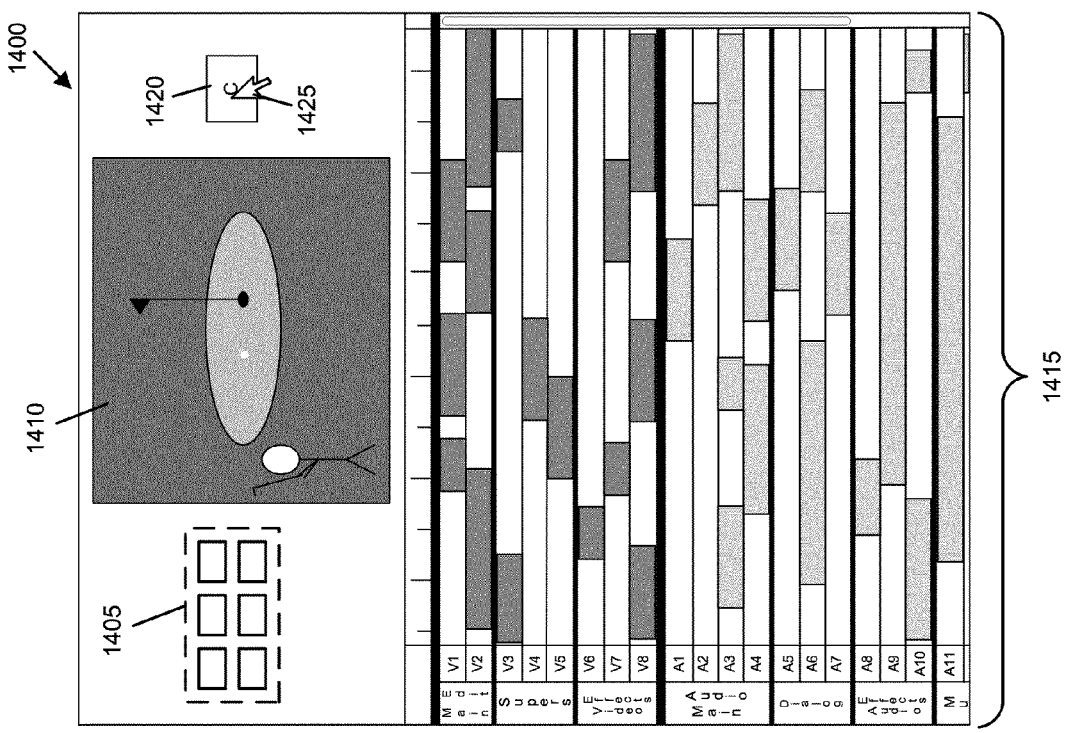

FIG. 13 conceptually illustrates a process 1300 of some embodiments for applying a compression feature. Process 1300 will be described by reference to FIGS. 14 and 15, which illustrate one possible implementation of the compression feature of some embodiments. FIGS. 14 and 15 illustrate a GUI 1400 for a media-editing application. Similar to the GUI 600 of FIG. 6, GUI 1400 includes a media library 1405, a preview display area 1410, and a composite display area 1415. GUI 1400 also includes a compression tool 1420.

As shown in FIG. 13, process 1300 begins (at 1305) by displaying a composite display area that includes several clip shapes in initial locations based on initial row assignments. Composite display area 1415 is an example of such a composite display area. Each of the clip shapes in composite display area 1415 is in a row. In some embodiments, the initial row represents a track to which the media clip represented by the clip shape is actually assigned. The assignments to tracks of the media clips is used by the media-editing application when creating the composite media presentation.

These tracks (and thus the rows) are arranged into groups in some embodiments, as shown in composite display area 1415. The rows (and thus the clip shapes) are arranged into two primary groups, video and audio. The video group is split into three sub-groups and the audio group is split into four sub-groups, like the groups in the composite display area 615 of FIGS. 6-12.

Next, process 1300 receives (at 1310) input to apply the compression feature. In some embodiments, the compression feature is provided as a UI item such as item 1420. The item may be a selectable button, command in a pull-down, drop-down, or other type of menu, or another type of UI item. In some embodiments, the compression feature may also be invoked by keyboard input. FIG. 14 illustrates a cursor 1425 over the compression UI item 1420.

After receiving input to apply the compression feature, the process determines (at 1315) new row assignments for each clip shape. The new row assignment for a particular clip shape indicates in which row in the composite display area the particular clip shape will be displayed. The new row assignment is merely a graphical assignment in some embodiments, and does not indicate that the corresponding media clip has actually changed tracks for the purpose of the actual creation of the media presentation. As such, after the application of the compression feature, the row assignments of the clip shapes are disassociated from the track assignments of the corresponding media clips.

In general, in assigning new rows, the process attempts to push the clip shapes together vertically without actually overlapping any of the clip shapes. In some embodiments, a destination row is selected, and the tracks are all pushed towards the destination row. However, each clip shape remains spanning the same portion of the timeline as in its initial position. Furthermore, a clip shape cannot pass by another clip shape if two clip shapes share a portion of the timeline. The row assignment process of some embodiments will be described in detail below by reference to FIG. 20.

The process then determines (at 1320) new locations for each clip shape. In some embodiments, the new row assignment and the new location are the same for each clip shape. However, in some embodiments, intermediate rows are removed (e.g., when groups and/or sub-groups are compressed separately) such that entire groups of tracks are shifted upwards or downwards as well. Thus, for some clip shapes, not only does a new row assignment need to be determined, but the new y-coordinate location of that row must be accounted for as well.

In some embodiments, determining the new locations entails determining new locations in the composite presentation window (such as composite presentation window 400 of FIG. 4). Once the new locations in the composite presentation window are determined for the clip shapes, then the new locations in the displayed composite display area are only a matter of determining what portion of the composite presentation window is within the display window (e.g., window 410).

Once the new locations are determined, process 1300 then computes (at 1325) a velocity for moving each graphical representation from its initial location to a new location based on the new row assignments. In some embodiments, the movement of the clip shapes from the initial location to the new location is animated in the composite display area. The animation is such that each clip shape starts and stops moving at the same time. Thus, the application determines the total distance each clip shape is to move, then divides those distances over the time allotted for the animation in order to compute the clip shape velocities.

The process then displays (at 1330) the movement of the clip shapes from their initial locations to their new locations.

As noted, this movement is animated such that all of the clip shapes start and stop moving in unison in some embodiments. Some embodiments, though, do not animate the clip shapes and instead just immediately display the clip shapes in the new locations. After displaying the clip shapes in the new locations, the process ends.

FIG. 15 illustrates the composite display area 1415 after the application of the compression feature to the clip shapes from FIG. 14. This illustrates the case where each of the seven groups is compressed separately, and the clip shapes in each group remain within the separate groups. In the illustrated case, the destination row for each group is the topmost row in the group. Some embodiments use the topmost row as a default. Some embodiments allow a user to select a row (e.g., topmost, bottommost, middle row, etc.). Other possibilities for how compression is applied (e.g., compressing all of the clips across the groups, compressing different groups in different directions) are described below.

The clip shapes in the main edit group 1505 are not moved at all. This is the case because all of the clip shapes in the V2 row (using the track name to identify the row, as shown in FIG. 14) are prevented from moving upwards into the V1 row by clip shapes in the V1 row. For instance, clip shape 1505 cannot move up a track because it partially overlaps in the timeline with clip shape 1510.

On the other hand, the composite display area real estate occupied by the main audio group 1520 is reduced from four rows to two rows by the application of the compression feature. Clip shapes 1525 and 1530 each move up two rows such that they are even vertically with clip shape 1535. This enables clip shape 1540 to also move up two rows, as clip shapes 1525 and 1530 are no longer preventing this move. Similarly, clip shapes 1545 and 1550 each move up one row, and the movement of clip shape 1545 allows clip shape 1555 to move up two rows.

Each of the other groups (supers, video effects, dialog, audio effects, and music) is compressed from three rows of clip shapes to two rows. This enables all of the clip shapes to be displayed in full size in the composite display area, although this will not always be the case. Although the track data is lost visually in some embodiments (i.e., the rows no longer are associated with a particular track), the association of each clip shape with a particular portion of the timeline is not lost. Accordingly, a user may still perform editing operations on the compressed clip shapes even though they are not displayed rows that correspond to the tracks to which the corresponding media clips are assigned for the creation of the presentation.

When the groups are compressed, various aspects of the display of the composite display area are modified in some embodiments. As shown in FIG. 15, the row labels are removed in some embodiments because the rows in the composite display area no longer correspond to particular tracks. For instance, clip shape 1530 and clip shape 1555 are not assigned to the same track when the editing application creates the composite video presentation, but they are displayed in the same row in the composite display area 1415. Some embodiments also remove the row indicator lines completely. On the other hand, some embodiments maintain the track associations visually by displaying track lines as moving up and down in the composite display area with the clip shapes. For example, in such embodiments, the track line between initial rows A2 and A3 would run below clips 1525 and 1530 (along with the track line between initial rows A1 and A2), then diagonal downwards and run between clips 1535 and 1555 (along with the track line between initial rows A3 and A4), then continue on in between clips 1545 and 1550 (without any other track lines). While displaying track lines, some embodiments nevertheless remove the track names (row labels) so that the beginning of more tracks will be visible in the composite display area.

Figure 17:
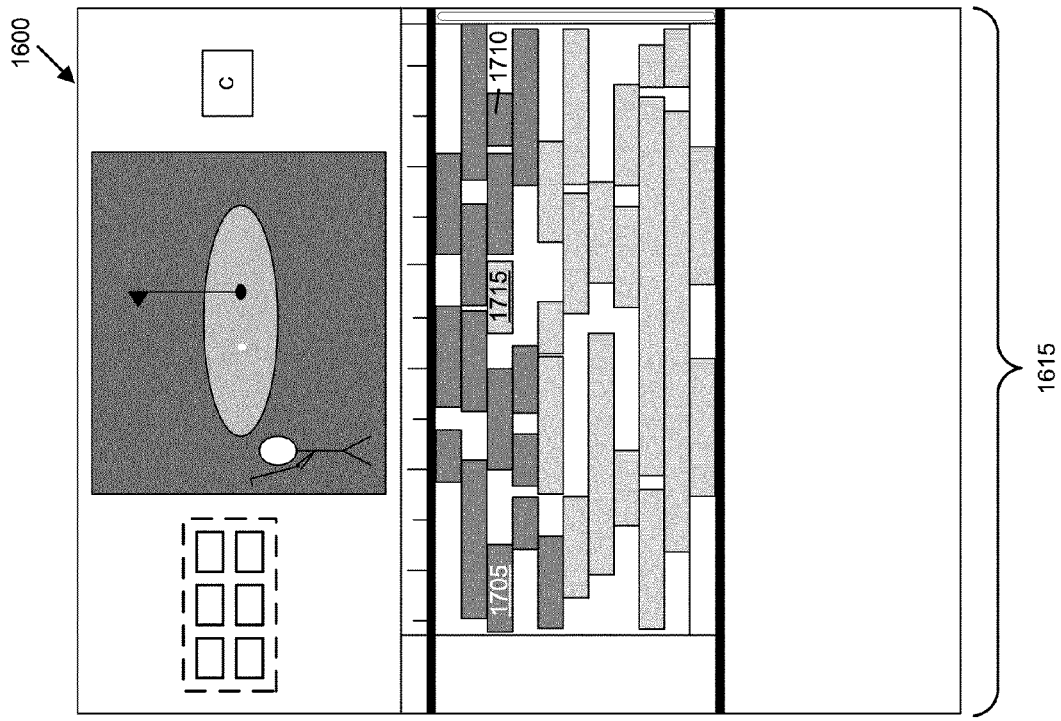
FIGS. 16 and 17 illustrate the application of a compression feature of some embodiments to clip shapes across sub-groups within a composite display area of a media-editing application.
Figure 16:
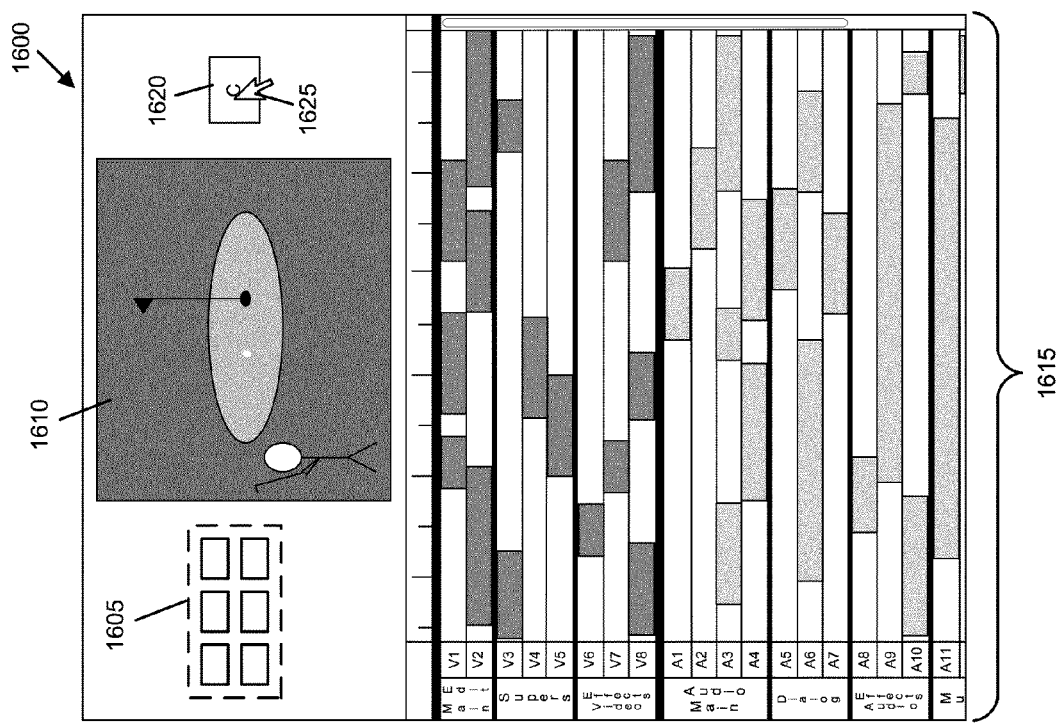

FIGS. 14 and 15 illustrated the case in which each of the groups is compressed separately. FIGS. 16 and 17 illustrate the case in which all of the clip shapes are compressed together and the group boundaries are removed. FIG. 16 illustrates a GUI 1600 for a media-editing application. Like GUI 1400 of FIG. 14, GUI 1600 includes a media library 1605, a preview display area 1610, a composite display area 1615, and a compression UI item 1620. Again, the composite display area 1615 is arranged into the same groups and subgroups as above. FIG. 16 also illustrates a cursor 1625 over the compression UI item 1620.

FIG. 17 illustrates the result of user interaction to apply the compression feature (e.g., by pressing and holding a cursor controller button with the cursor over the compression UI item 1620). In FIG. 17, all of the clip shapes are moved upwards towards row V1. The clip shapes in the first two rows have not moved, because all of the clip shapes in row V2 are blocked by clip shapes in V1. However, the remainder of the clip shapes have at least moved up slightly. Clip shapes 1705 and 1710, for example, move up an amount equal to the thickness of the sub-group boundary. Other clip shapes move up significantly further. For instance, clip shape 1715, from the main audio sub-group, moves up to the same row as clip shapes 1705 and 1710.

In FIG. 17, the composite display area 1615 does not display any group labels or row labels. As the sub-groups are no longer separate, the group labels no longer have any meaning. Some embodiments, though, display the clip shapes of each sub-group in a different color. In the example shown, the clip shapes of each of the primary groups (video and audio) have different colors, but there is no distinction between the sub-groups within a group.

The track lines have also been removed from composite display area 1615 in FIG. 17. As noted above, some embodiments remove track lines altogether, some embodiments display the track lines as before but do not ascribe meaning to the track lines in terms of representing the actual data tracks, and some embodiments display the track lines from the uncompressed composite display area as moving up and down in the composite display area with the clip shapes.

Figure 18:
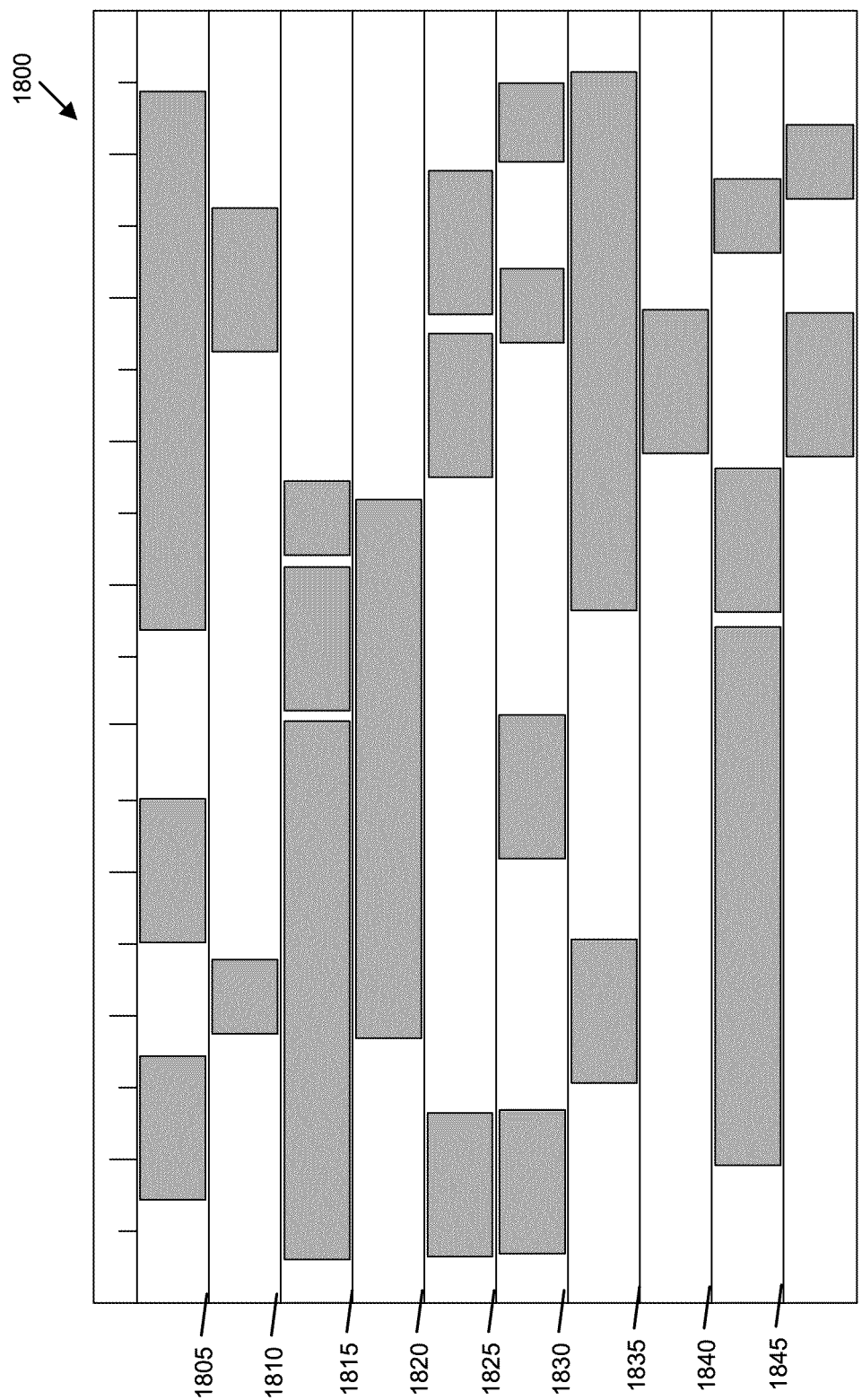
FIGS. 18 and 19 illustrate the application of a compression feature of some embodiments to a composite display area in which track lines are maintained.
Figure 19:
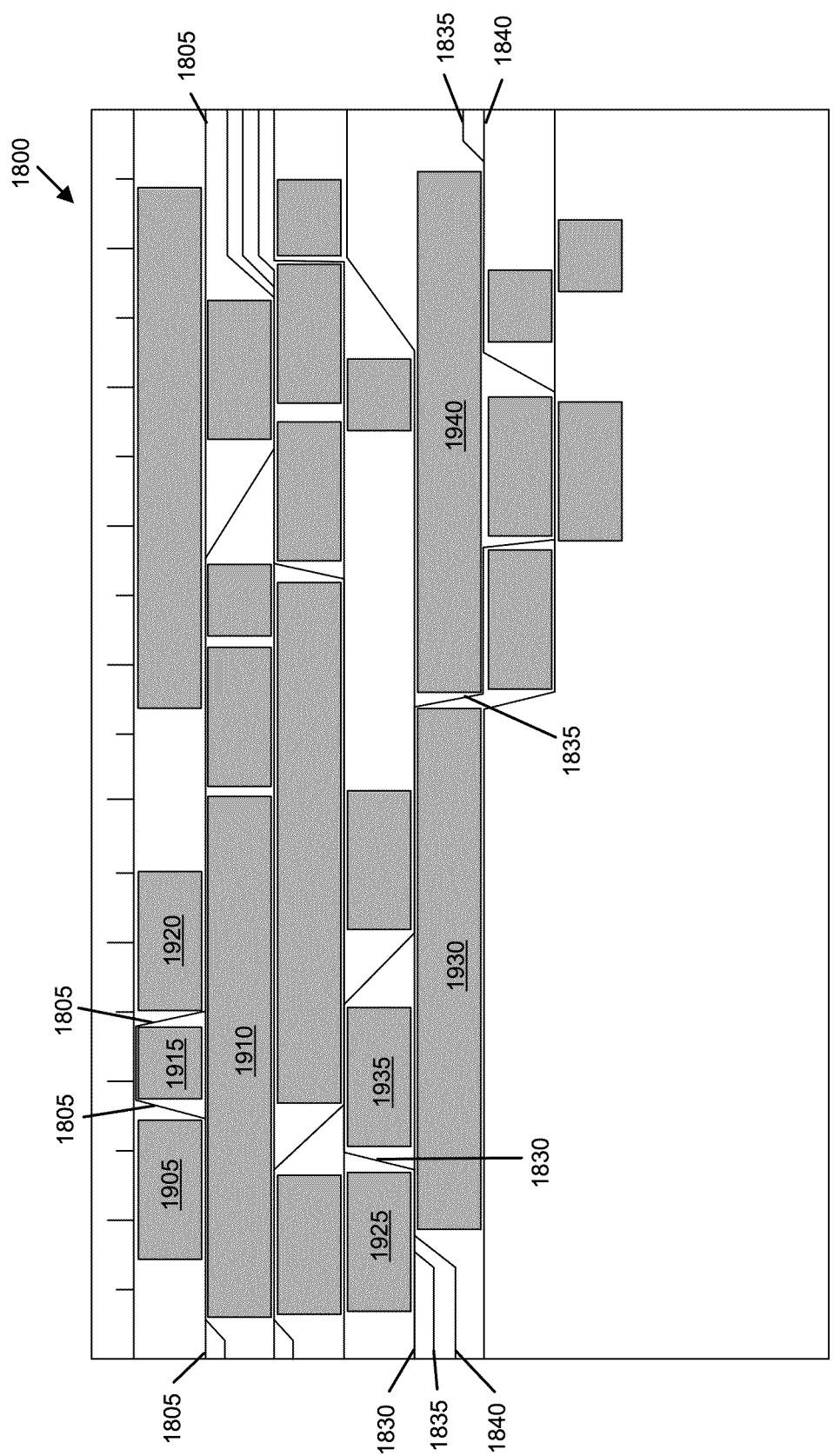

An example of such track lines is illustrated in FIGS. 18 and 19. These figures illustrate a composite display area 1800 and the application of the compression feature to the clip shapes in the composite display area. When the compression feature is applied to the composite display area 1800, the track lines between the rows of clip shapes are displayed as moving along with the compressed clip shapes.

FIG. 18 illustrates composite display area 1800 prior to compression being applied to the display area. The display area includes multiple clip shapes among 10 rows, each of which correspond to a track. Between the rows are nine track lines 1805-1845. FIG. 19 illustrates the composite display area 1800 after the application of the compression feature. The clip shapes have been compressed from ten rows into seven, where the vertical position of the rows no longer corresponds to a particular track.

FIG. 19 also displays the track lines 1805-1845 between the clip shapes. Each of the track lines runs over or under the same clip shapes as in the uncompressed composite display area of FIG. 18. For example, track line 1805 starts in the same place, but after passing between clip shapes 1905 and 1910 it moves up to run above clip shape 1915 and then back down below clip shape 1920, then continues on in a straight path. As a second example, track line 1835 is quickly merged with track lines 1830 and 1840 to pass between clip shapes 1925 and 1930, continues between clip shapes 1935 and 1930 while track line 1830 breaks off upwards, drops down underneath clip shape 1940, and finally splits off of track line 1840 at the right edge of the composite display area. As shown, some embodiments split up any merged track lines at the edges of the composite display area in order to indicate the different tracks to the user.

The track lines in FIG. 19 are illustrated as merged when multiple track lines run between clip shapes. However, some embodiments do not merge the track lines but instead spread the clip shapes out enough such that each track line is visible separately. These slight adjustments in the clip shape position must be accounted for when determining the new positions for the clip shapes during the compression process (e.g., operation 1320 of process 1300).

IV. Row Assignment of Clip Shades During Compression

Figure 20:
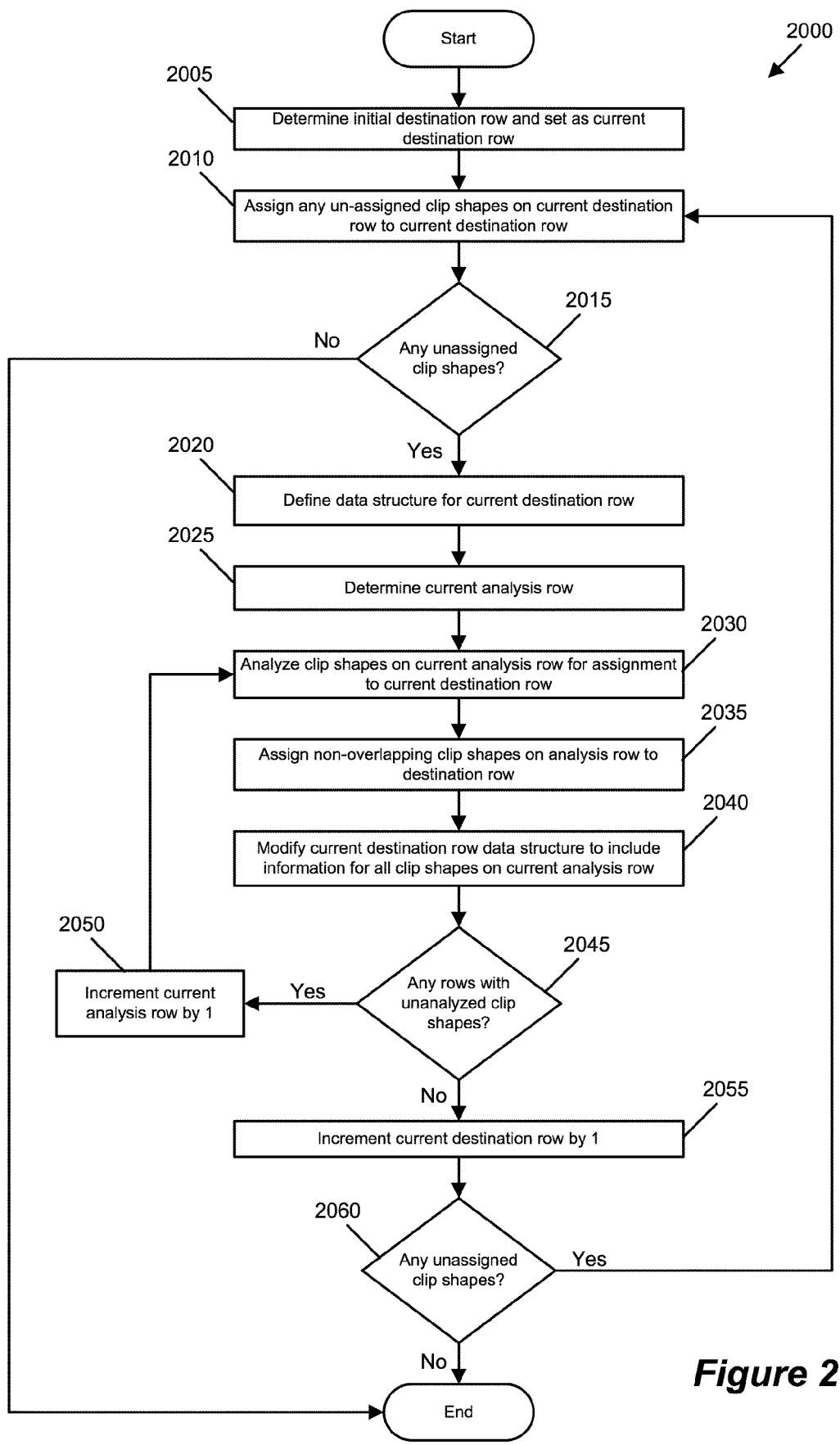
FIG. 20 conceptually illustrates a process 2000 of some embodiments for assigning clip shapes to new rows when applying the compression feature to clip shapes in a composite display area.

As described above, when applying the compression feature, the media-editing application of some embodiments determines new rows for each of the clip shapes. The following section will describe this process in greater detail. FIG. 20 conceptually illustrates a process 2000 of some embodiments for assigning clip shapes to new rows when applying the compression feature to clip shapes in a composite display area. Process 2000 is applied to each group that is being compressed. Thus, if there are two groups, process 2000 is applied twice. In the example of FIGS. 14 and 15, process 2000 is applied seven times, once for each sub-group. On the other hand, in the example of FIGS. 16 and 17, process 2000 is applied only once to all of the clip shapes. One of ordinary skill will recognize that process 2000 is only one example of a process for assigning clip shapes to new rows when applying the compression feature of some embodiments, and that other processes are possible to serve this purpose as well.

Figure 21:
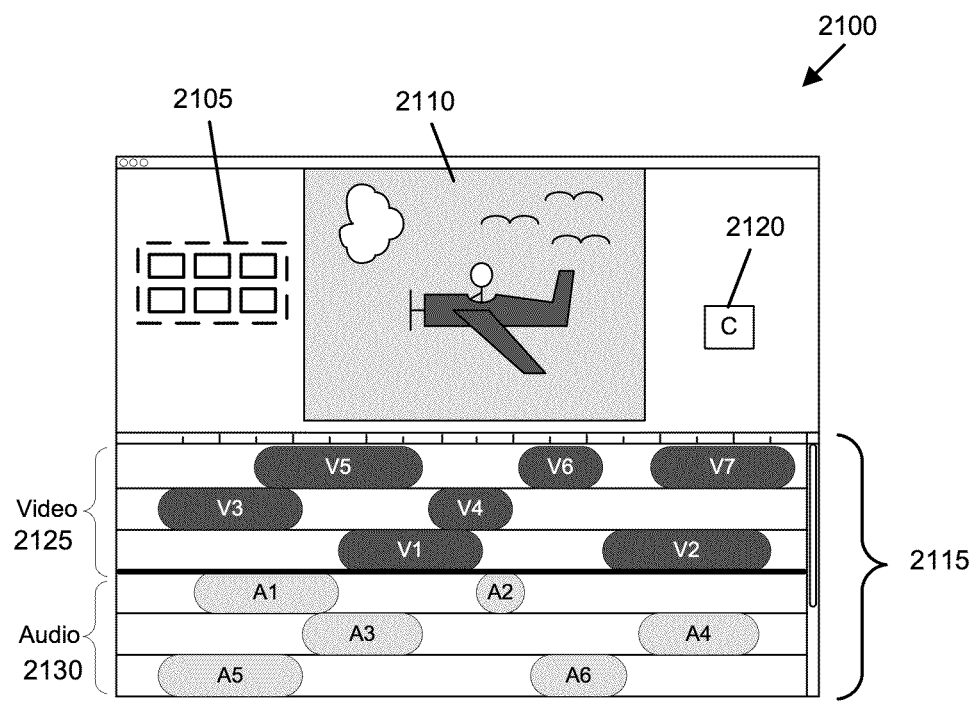
FIG. 21 illustrates a GUI for a media-editing application that includes a composite display area.

Process 2000 will be described by reference to FIGS. 21 and 22. FIG. 21 illustrates a GUI 2100 for a media-editing application that includes a media library 2105, a preview display area 2110, a composite display area 2115, and a compression UI item 2120. These elements of the GUI 2100 are similar to the corresponding elements of the GUIs described above, such as GUI 600. The composite display area 2115 includes two groups, a video group 2125 and an audio group 2130. The application of the compression feature to composite display area 2115 causes the clip shapes in the video group to move downward and the clip shapes in the audio group to move upward. FIGS. 22A-22D illustrate the application of process 2000 to the composite display area 2115 in order to determine new rows for the display of the clip shapes to apply the compression feature. FIGS. 22A-22D illustrates this process over the course of 10 stages, 2201-2210. In FIGS. 22A-22D, the process is actually applied twice, first to the video group 2125 and then to the audio group 2130.

Figure 22A:
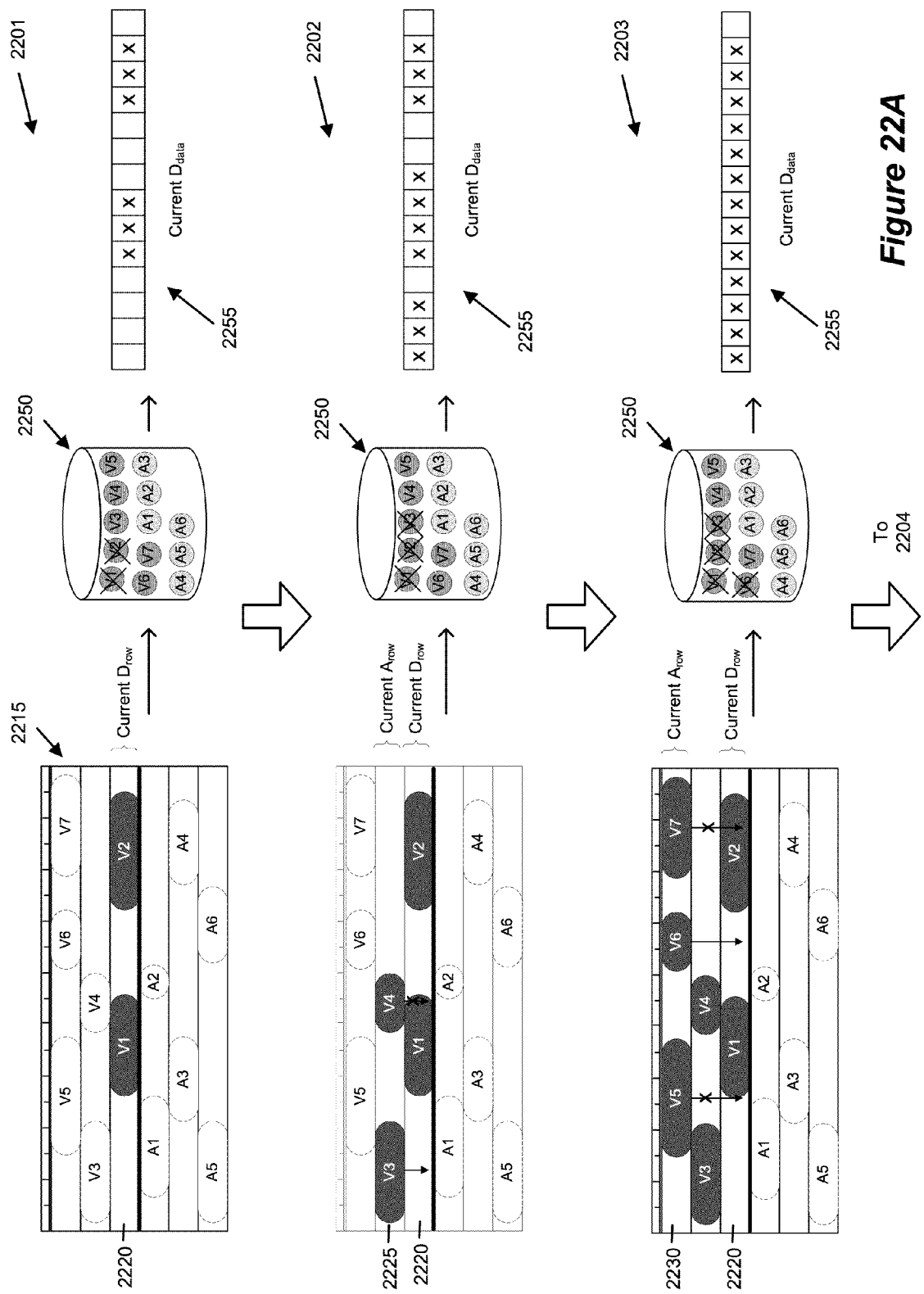
FIGS. 22A-22D illustrate a row assignment process of some embodiments as applied to the composite display area of the GUI of FIG. 21.

Process 2000 begins by determining (at 2005) an initial destination row and setting this initial destination row as the current destination row. The initial destination row is the row towards which all of the clip shapes move in some embodiments. FIG. 22A conceptually illustrates a data construct 2215 for composite display area 2115. Row 2220 is the initial destination track, and thus the first current destination track. FIG. 22A also conceptually illustrates a storage bin 2250. Storage bin 2250 is a data storage (e.g., a data structure) that includes a marker for each of the clip shapes in the data construct 2215. Once a clip shape is assigned to a row, the corresponding marker is removed from the storage bin 2250. In some embodiments, removing a marker entails indicating that the marker's clip shape has been assigned.

Process 2000 next assigns (at 2010) any unassigned clip shapes on the current destination row to the current destination row. These are the clip shapes that are not changing rows during the compression process. At stage 2201 of FIG. 22A, the clip shapes V1 and V2 are assigned to the row 2220. These shapes are also removed from storage bin 2250 at this time, as they are now assigned.

The process next determines (at 2015) whether there are any unassigned clip shapes. When all of the clip shapes are assigned, process 2000 ends. Otherwise, the process defines (at 2020) a data structure for the current destination row. The data structure indicates x-coordinates within the row (i.e., along the timeline) at which clip shapes can and cannot be moved into the row. If a clip shape that is a candidate for moving into the row occupies any x-coordinate that is already indicated in the data structure, then the clip shape cannot be moved into the destination row. Data structure 2255 of FIG. 22A is a conceptual illustration of such a data structure. Data structure 2255 is marked off with Xs at x-coordinates that correspond to clip shapes V1 and V2. While data structure 2255 illustrates fourteen x-coordinate regions, one of ordinary skill in the art will recognize that actual data structures used will be much more finely split up in some embodiments.

Process 2000 then determines (at 2025) a current analysis row. This is the row on which clip shapes will be analyzed for movement into the current destination row. The first analysis row for a particular destination row is the row that is next to the particular destination row, moving away from the initial destination row. Thus, in stage 2202 of FIG. 22A, the current analysis row is row 2225.

The process then analyzes (at 2030) the clip shapes on the current analysis row to determine whether they can be assigned to the current destination row. In some embodiments, this entails determining, for a particular clip shape on the current analysis row, whether the clip shape occupies any x-coordinate that is not available in the data structure for the destination row. The process then assigns (at 2035) any non-overlapping clip shapes on the current analysis row to the current destination row. In stage 2202 of FIG. 22A, clip shape V3 is such a non-overlapping clip shape, as there is no indicator in the data structure 2255 at any of the x-coordinates occupied by clip shape V3. On the other hand, clip shape V4 cannot move down to row 2220 because it is partially blocked by clip V1. Thus, clip shape V3 is assigned to row 2220 and clip shape V4 remains unassigned. As clip shape V3 is assigned, its marker is removed from storage bin 2250.

Process 2000 next modifies (at 2040) the data structure for the current destination row to include information for all of the clip shapes that were in the current analysis row. This includes both clip shapes that were assigned to the current destination row and those that were not. The clip shapes that were overlapping, and thus not assigned to the destination row, are nevertheless included because they can block clip shapes in analysis rows further from the destination row from moving into the destination row. For instance, V4 could block any clip shapes above from moving down to row 2220 and thus its presence must be noted in data structure 2255.

The process then determines (at 2045) whether any rows with unanalyzed clip shapes remain. That is, the process determines whether any rows remain that could include clip shapes that move into the current destination row. When there are no more such rows, the process proceeds to 2055, which is described below. When at least one such row remains, the process increments (at 2050) the current analysis row by one row. Thus, at stage 2203 of FIG. 22A, the current analysis row has been moved up one to row 2230. Process 2000 then returns to 2030 to analyze the clip shapes in the current analysis row for movement to the current destination row. At stage 2203, clip shape V5 is not assigned to destination row 2220 because it is blocked by clip shapes V3 and V1, clip shape V6 is assigned to destination row 2220 because it fits between clip shapes V4 and V2, and clip shape V7 is not assigned to destination row 2220 because it is blocked by clip shape V2. Because clip shape V6 is assigned, its corresponding marker is removed from storage bin 2250.

Figure 22B:
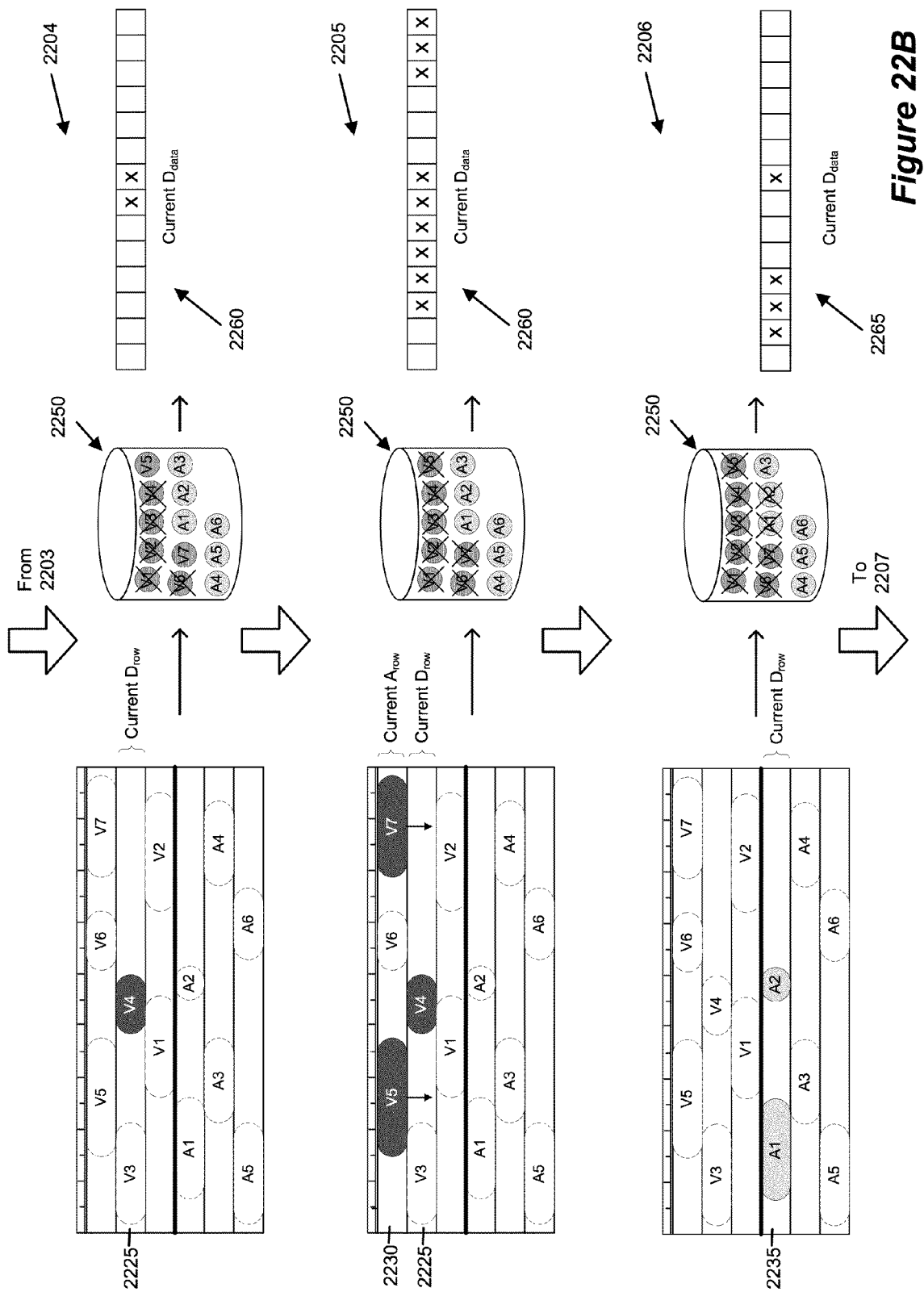

Once all possible rows have been analyzed for assignment to the current destination track, the process increments (at 2055) the current destination row by one row. This is the row that was the first analysis row for the previous destination row. In the example of FIG. 22B, stage 2204 illustrates that the destination row has now moved to row 2225. After incrementing the destination row, the process determines (at 2060) whether there are any unassigned clip shapes left, including clip shapes in the current destination row. When there are no more unassigned clip shapes, the process returns to 2010. Otherwise, the process ends.

Examining the storage bin 2250, clip shapes V4, V5, and V7 are all unassigned after stage 2203. Stage 2204 illustrates that clip shape V4 is in current destination row 2225, and thus is assigned to this row (i.e., clip shape V4 does not move during the compression process). The corresponding marker for clip shape V4 is removed from the storage bin, and the x-coordinates occupied by the clip shape are indicated in the new data structure 2260 for destination row 2225. Proceeding to stage 2205, the initial analysis row for the current destination row 2225 is row 2230. As shown, clip shapes V5 and V7 are both assigned to destination row 2225. Although clip shape V3 would be blocking clip shape V5, because clip shape V3 has been assigned to row 2220, it is not taken into account when determining whether clip shape V5 can be assigned to row 2225. At this point, all of the video clip shapes in storage bin 2250 have been assigned to a new row. As such, the process 2000 as applied to these clip shapes would end.

Figure 22C:
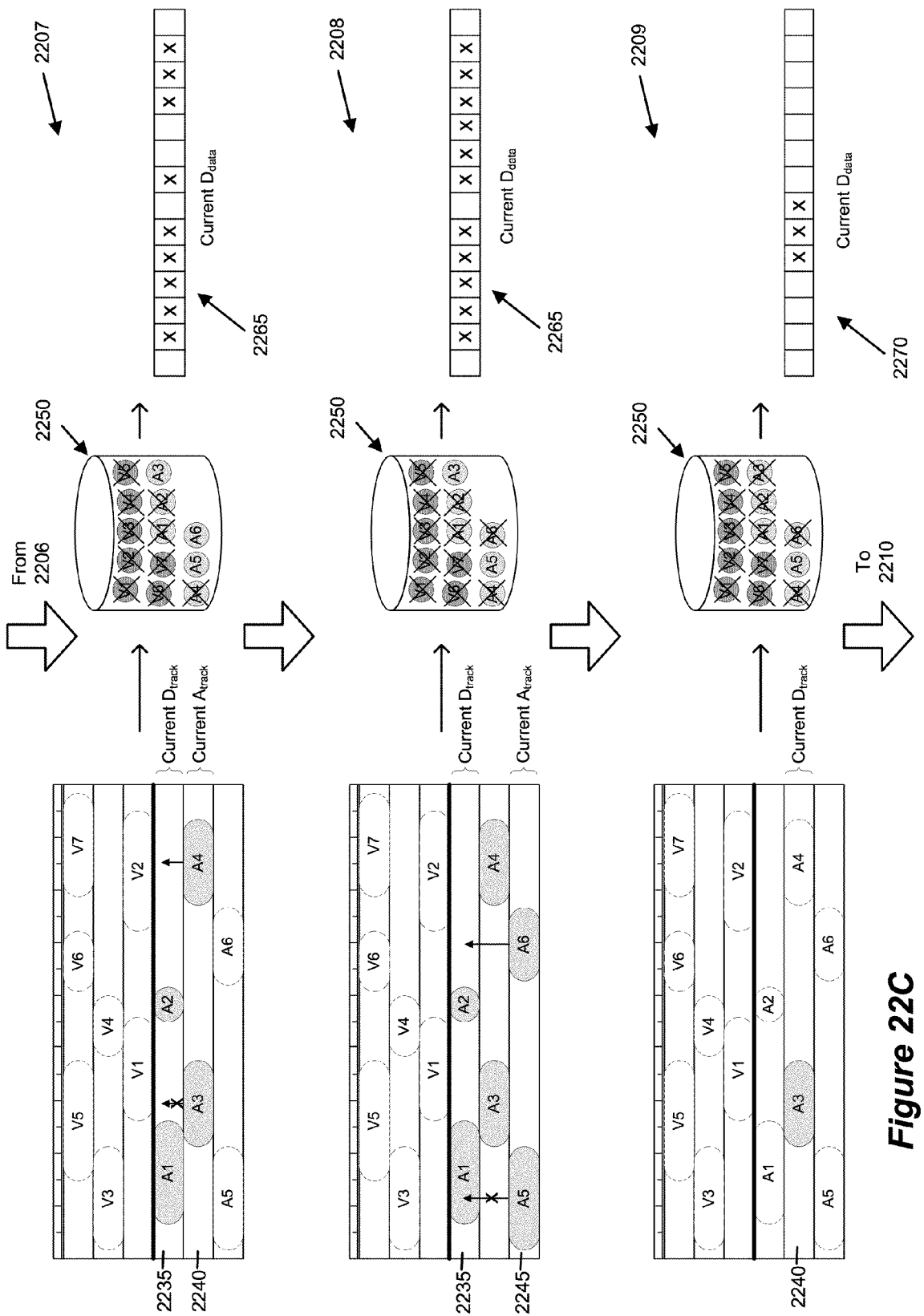
Figure 22D:
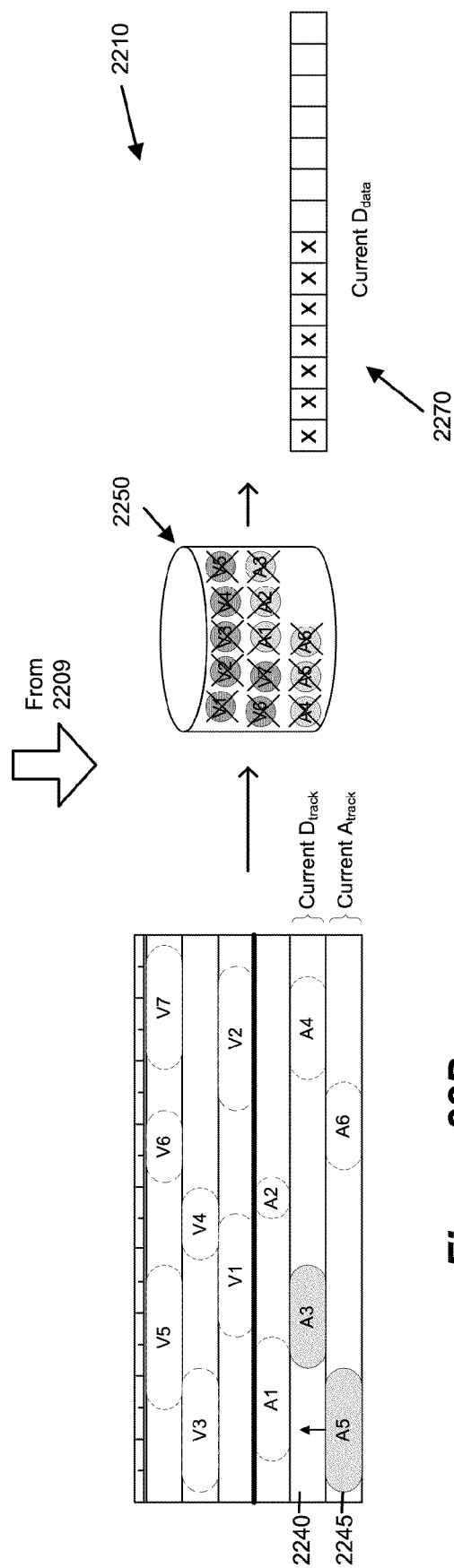

As noted, when compression is applied separately to more than one group, process 2000 or a similar process will be applied to each group. In the example of FIGS. 22C-22D, stages 2206-2210 illustrate the application of process 2000 to the audio group of clip shapes. In this example, the audio clip shapes are moved up towards initial destination row 2235. At stage 2206, the current destination row is row 2235, and the two clip shapes A1 and A2 in the row are assigned and removed from storage bin 2250. Data structure 2265 is defined and indicators are entered to mark the x-coordinates of clip shapes A1 and A2.

At stage 2207, the first analysis row 2240 is analyzed for assignment to destination row 2235. Clip shape A3 cannot move up because of clip shape A1, but clip shape A4 can move up and is thus assigned to row 2235 and removed from storage bin 2250. The x-coordinates for both of these clip shapes are indicated in data structure 2265. At stage 2208, the analysis row is moved to row 2245. Clip shape A5 is prevented from moving to destination row 2235 by clip shape A1, while clip shape A6 fits between clip shapes A2 and A4 and is thus assigned to row 2235 and removed from storage bin 2250.

At stage 2209, the destination row has moved to row 2240, and clip shape A3 is assigned to this row and its marker removed from storage bin 2250. Data structure 2270 is defined for destination row 2240, and the x-coordinates of clip shape A3 are indicated in the data structure. Next, at stage 2210, row 2245 is the analysis row, and the only unassigned clip shape, clip shape A5, is assigned to destination row 2240.

When the marker for clip shape A5 is removed from storage bin 2250, the storage bin is now empty and the row assignment process can end.

Figure 23:
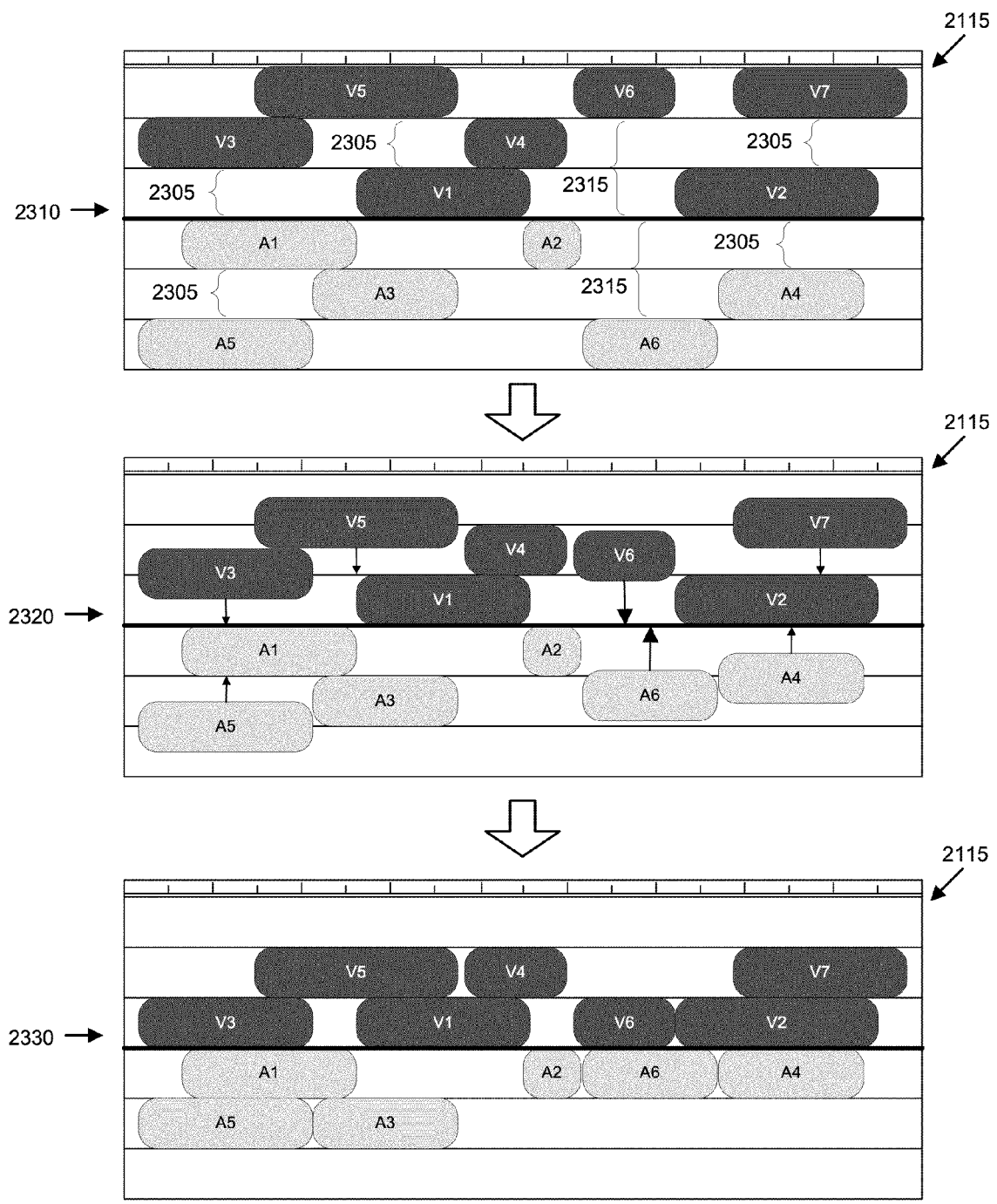
FIG. 23 illustrates the animation of clip shapes in the composite display area of the GUI of FIG. 21.

Once the rows are assigned, the editing application of some embodiments can determine the velocities for animating the clip shapes and display the animation. FIG. 23 illustrates the animation of the composite display area 2115 in three stages. The first stage 2310 illustrates the clip shapes at their initial positions, the second stage 2320 illustrates the clip shapes approximately halfway through the animation, and the third stage 2330 illustrates the clip shapes at their final positions.

The first stage 2310 also conceptually illustrates the distances that each clip shape will move during the animation. Clip shapes V3, V5, V7, A4, and A5 each move a distance 2305 (i.e., one row of movement). Clip shapes V6 and A6 each move a distance 2315 (i.e., two rows of movement, which is twice the distance 2305). One of ordinary skill will recognize that in cases such as that illustrated in FIGS. 16 and 17, the distances for the animation will be more complicated due to the removal of group and sub-group boundaries that take up space. Furthermore, if track lines are displayed, as illustrated in FIG. 19, space for the track lines must be factored into the distance calculations.

Stage 2320 illustrates the clip shapes in composite display area 2115 approximately halfway through the animation of the compression process. At this point, clip shapes V6 and A6 have moved twice as far as clip shapes V3, V5, V7, A4, and A5. Arrows are shown to indicate the direction that the clip shapes are moving at this point. The arrow heads on the arrows for clip shapes V6 and A6 are larger than those for the other moving clip shapes to indicate that clip shapes V6 and A6 are animated at a larger velocity.

Finally, stage 2330 illustrates the composite display area 2115 after the clip shapes have finished moving. In the case illustrated here, the two groups of clip shapes are moved towards the center of the composite display area. While this compresses the clip shapes, it also leaves blank space above the upper of the two groups. Some embodiments shift all of the clip shapes up one or more rows so as to avoid leaving blank space in the composite display area. This can be important when the groups are much larger and have significantly more tracks than are shown in the present example.

V. Software Architecture

Figure 24:
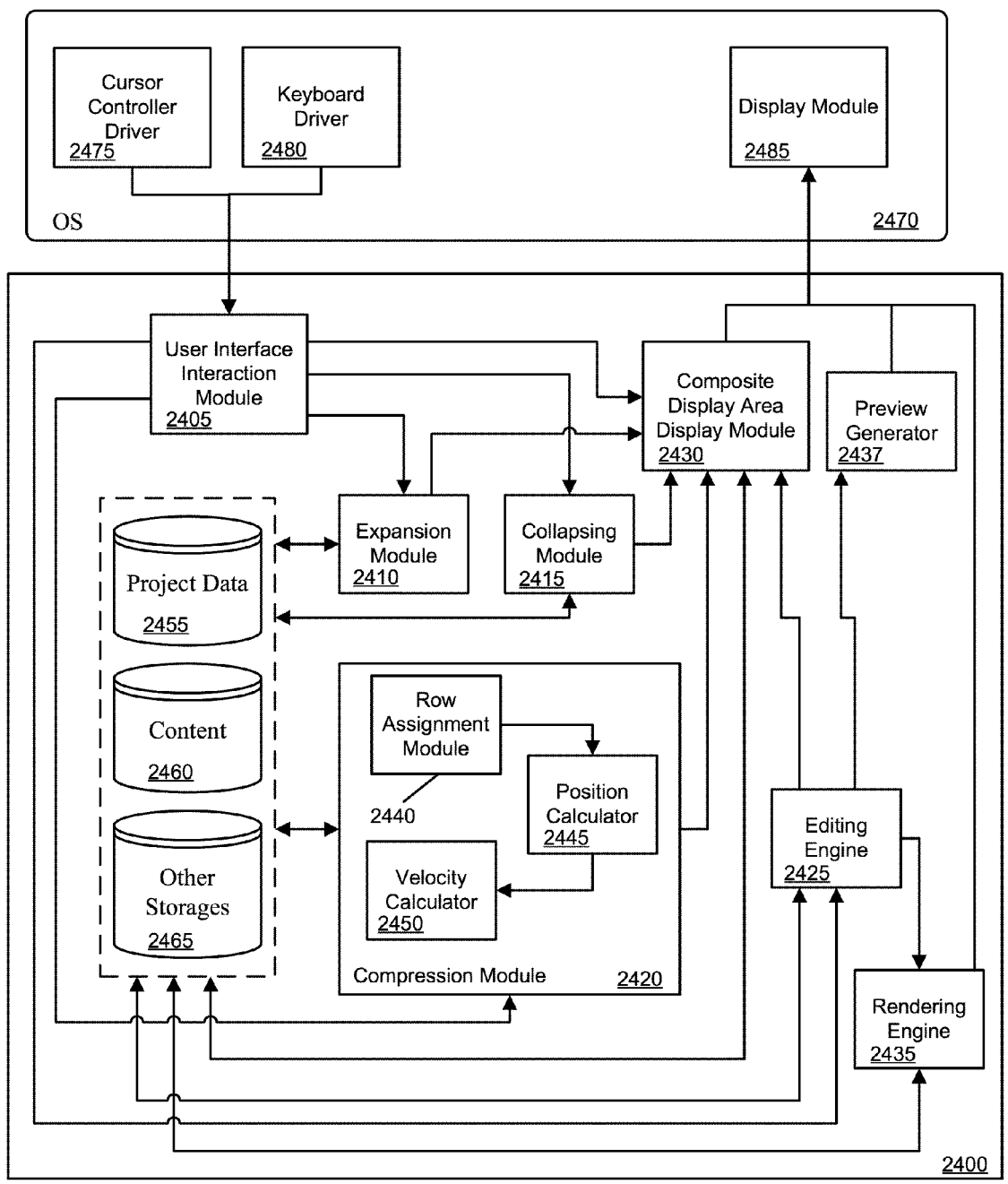
FIG. 24 conceptually illustrates the software architecture of a media-editing application of some embodiments.

In some embodiments, the processes described above are implemented as software running on a particular machine, such as a computer or a handheld device, or stored in a computer readable medium. FIG. 24 conceptually illustrates the software architecture of a media-editing application 2400 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Media-editing application 2400 includes a user interface (UI) interaction module 2405, an expansion module 2410, a collapsing module 2415, a compression module 2420, an editing engine 2425, a composite display area module 2430, a rendering engine 2435, and a preview generator 2437. The media-editing application also includes project data storage 2455, content storage 2460, and other storages 2465. In some embodiments, the project data storage 2455 stores data about a composite media presentation, such as in and out points for media clips, information about transitions between media clips, etc. Content storage 2460 includes the media clips that are used by the media-editing application to create a composite presentation. In some embodiments, storages 2455, 2460, and 2465 are all one physical storage. In other embodiments, the storages are in separate physical storages, or two of the storages are in one physical storage while other storages are in a different physical storage.

FIG. 24 also illustrates an operating system 2470 that includes cursor controller driver 2475, keyboard driver 2480, and display module 2485. In some embodiments, as illustrated, the cursor controller driver 2475, keyboard driver 2480, and display module 2485 are part of the operating system 2470 even when the media-editing application 2400 is an application separate from the operating system.

A user interacts with the user interface via input devices (not shown). The input devices, such as cursor controllers (mouse, tablet, touchpad, etc.) and keyboards, send signals to the cursor controller driver 2455 and keyboard driver 2460, which translate those signals into user input data that is provided to the UI interaction module 2405. Some embodiments include a touchscreen that sends signals to the UI interaction module 2405 as well. The UI interaction module interprets the user input data and passes it to various modules, including the expansion module 2410, the collapsing module 2415, the compression module 2420, and the editing engine 2425.

Expansion module 2410 receives input through the UI interaction module 2405. When the input indicates to expand one or more groups, the expansion module uses any necessary information from the project data 2455 to determine which clip shapes to expand and how much to expand them. The expansion module 2410 passes expansion information to the composite display area display module 2430, which generates the display of the composite display area.

Similarly, collapsing module 2415 receives input through the UI interaction module 2405. When the input indicates to collapse one or more groups, the collapsing module uses any necessary information from the project data 2455 to determine which clip shapes to collapse and how much to collapse them. The collapsing module 2415 passes collapsing information to the composite display area display module 2430.

Compression module 2420 also receives input from the UI interaction module 2405. Compression module 2420 includes a row assignment module 2440, a position calculator 2445, and a velocity calculator 2450. In some embodiments, upon receiving input to compress clip shapes in a composite display area, compression module 2420 performs process 1300 or a similar process. Compression module 2420 also receives any necessary information (i.e., track assignment information) about the clip shapes from project data storage 2455.

The row assignment module 2440 assigns the clip shapes in the composite display area to new rows. In some embodiments, module 2440 performs process 2000 or a similar process. The position calculator 2445 receives the row assignment information and calculates a new position in the composite display area for the clip shapes. The velocity calculator 2450 calculates the speed and direction that each clip shape being compressed has to move in the composite display area. This animation information is then passed to the composite display area display module 2430.

The editing engine 2425 also receives information from the UI interaction module 2405. A user can user the interface of the editing application to edit the composite media presentation through the composite display area. For instance, a user can modify the composite presentation by using roll edits, ripple edits, slide edits, etc. The editing engine 2425 passes information to the composite display area 2430, and when the application is to render the media presentation, the rendering engine 2435.

Composite display area display module 2430 manages the display of the composite display area of the GUI of the editing application. In some embodiments, module 2430 receives input from the UI interaction module 2405 and manages group selection. In other embodiments, this is performed by a separate module. Module 2430 also receives project information from storage 2455 in order to determine what to display in the composite display area. The composite display area may be modified due to information from the expansion module 2410, collapsing module 2415, and/or compression module 2420. Edits performed by the editing engine will also affect the composite display area. Information about displaying the composite display area is sent to the display module 2485.

Rendering engine 2435 enables the storage or output of audio and video from the media-editing application 2400. Rendering engine 2435 receives data from the editing engine 2425 and, in some embodiments creates a composite media presentation from individual media clips. The composite media presentation can be stored in the storages or output to the display module 2485.

Preview generator 2437 enables the output of audio and video from the media-editing application so that a user can preview the composite presentation. The preview generator 2437, based on information from the editing module 2425 (and, in some embodiments, other modules), sends information about how to display each pixel of a presentation to the display module 2485.

While many of the features have been described as being performed by one module (e.g., the expansion module 2410 or collapsing module 2415), one of ordinary skill would recognize that the functions might be split up into multiple modules, and the performance of one feature might even require multiple modules.

Figure 25:
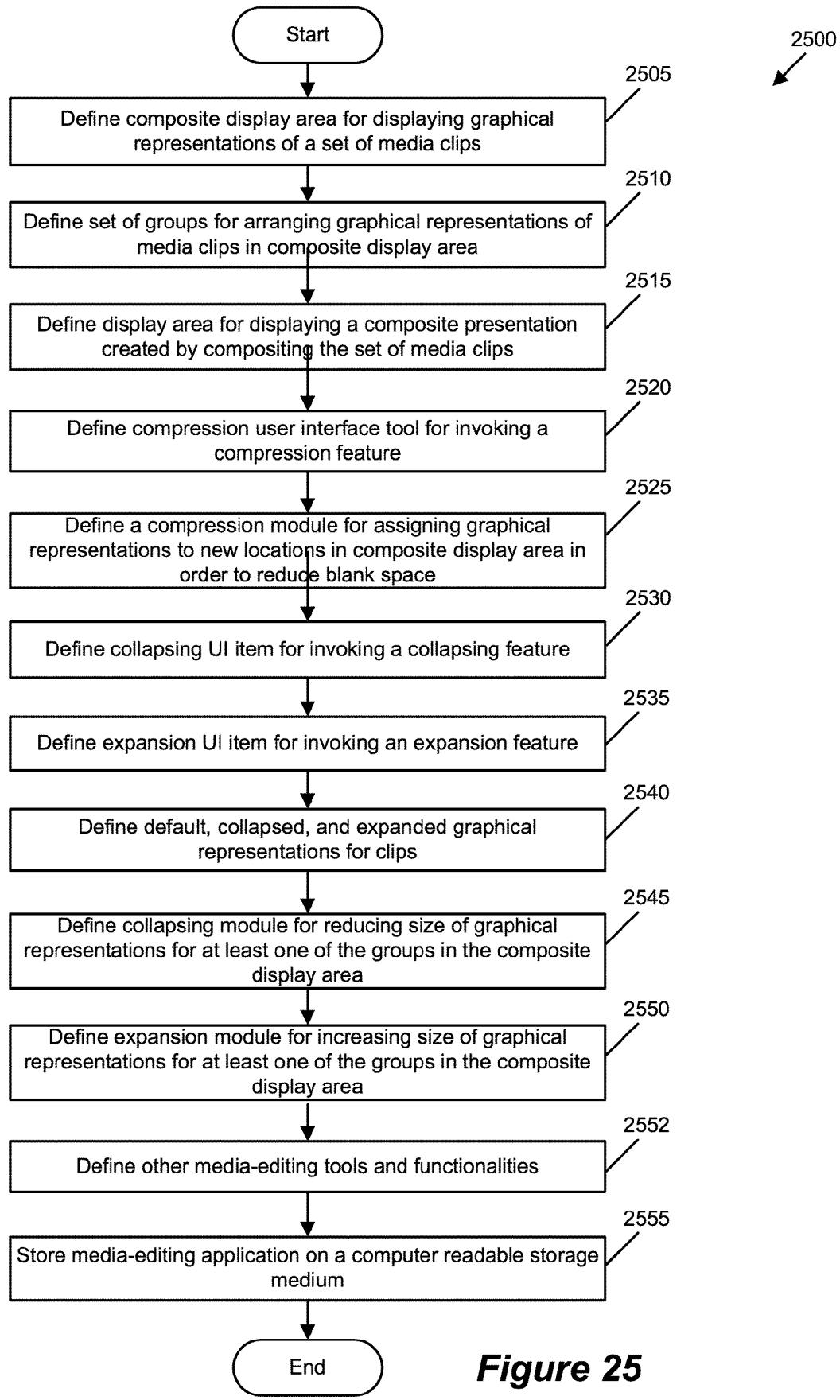
FIG. 25 conceptually illustrates a process of some embodiments for manufacturing a computer readable medium that stores a computer program.

FIG. 25 conceptually illustrates a process 2500 of some embodiments for manufacturing a computer readable medium that stores a media-editing application such as application 2400 described above. In some embodiments, the computer readable medium is a distributable CD-ROM. As shown, process 2500 begins by defining (at 2505) a composite display area for displaying graphical representations of a set of media clips. For instance, the composite display areas 320 and 615 of FIGS. 3 and 6 are examples of the defined composite display area. The process next defines (at 2510) a set of groups for arranging the graphical representations of media clips in the composite display area. The groups and subgroups 355-364 in composite display area 320 are one example of the groups that could be defined. Process 2500 then defines (at 2515) a display area for displaying a composite presentation created by compositing the set of media clips. For instance, preview display area 310 is such a display area.

Process 2500 then defines (at 2520) a compression user interface tool for invoking a compression feature. The compression feature described by reference to FIGS. 13-23 above is an example of such a feature. The process next defines (at 2525) a compression module for assigning graphical representations to new locations in the composite display area in order to reduce blank space (i.e., for executing the compression feature). The module 2420 of FIG. 24 above is an example of such a compression module.

Process 2500 then defines (at 2530) a collapsing UI item for invoking a collapsing feature and defines (at 2535) an expansion UI item for invoking an expansion feature. The collapsing and expansion features described by reference to FIGS. 5-12 above are examples of such features. The process next defines (at 2540) default, collapsed, and expanded graphical representations for clips. In some embodiments, these are the standard size in a composite display area for the graphical representations and the sizes of the graphical representations after collapsing and expanding them. Next, process 2500 defines (at 2545) a collapsing module for reducing the size of graphical representations for at least one of the groups in the composite display area. The process defines (at 2550) an expansion module for increasing the size of the graphical representations for at least one of the groups in the composite display area. Collapsing module 2415 and expansion module 2410 are examples of such modules.

The process then defines (at 2552) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process defines these additional tools in order to create a media editing application that has many additional features to the features described above.

Figure 26:
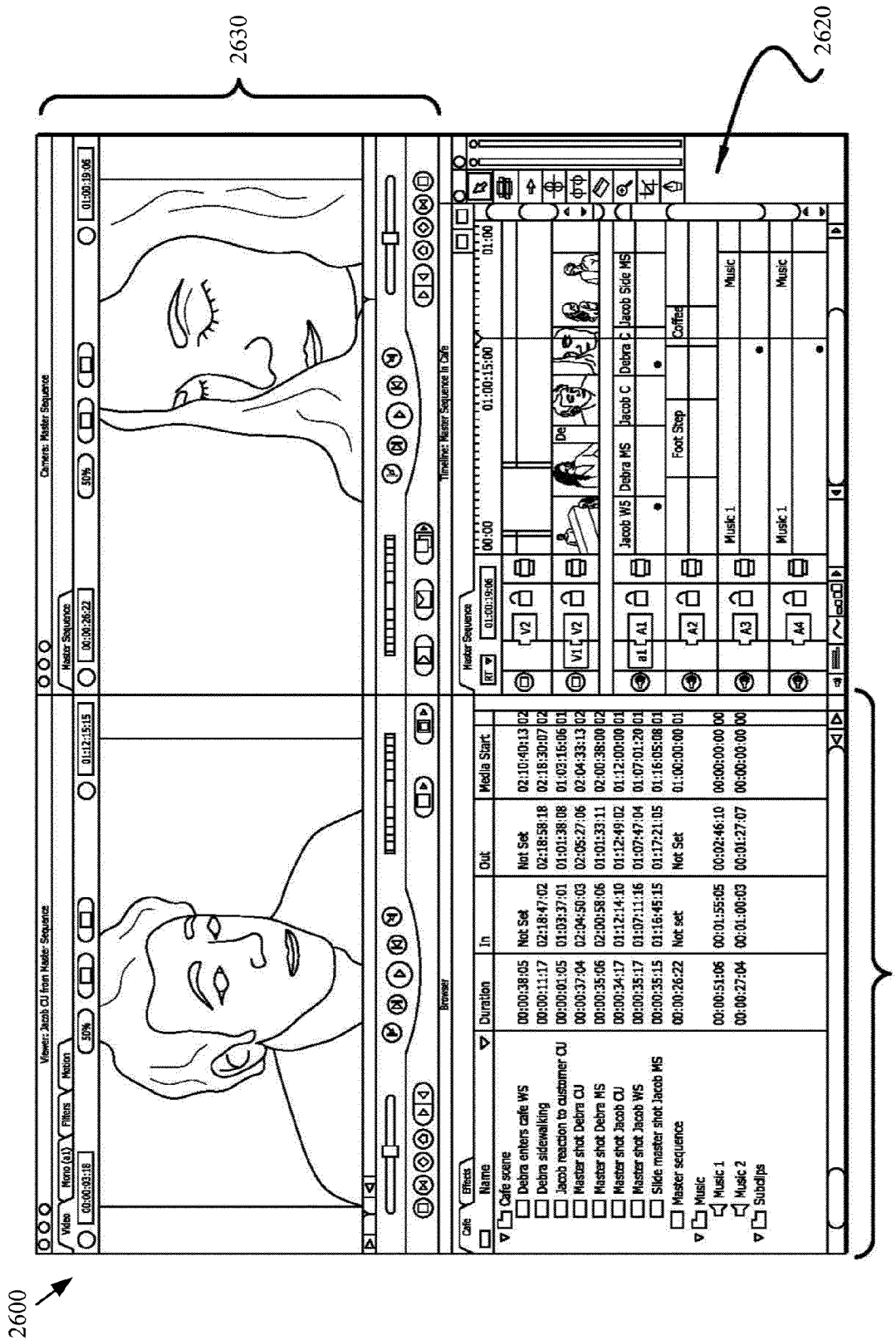
FIG. 26 illustrates a detailed view of a media-editing application of some embodiments.

A more detailed view of a media editing application with these additional features is illustrated in FIG. 26. Specifically, this figure shows a media editing application with these additional tools. FIG. 26 illustrates a list of video and/or audio clips 2610, video editing tools 2620, and video displays 2630. The list of clips 2610 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 2620 include tools that allow a user to graphically set in and out points for video clips (in other words, where in the final product a specific clip or part of a clip will be shown). The video editing tools 2620 can be used to modify the temporal sequence of the video frame and to synchronize audio tracks with video tracks (e.g., in order to add music over a video clip). In some embodiments, video editing tools 2620 also give users the ability to edit in effects or perform other video editing functions. In some embodiments, the video editing tools include trim tools for performing edits such as slide edits, ripple edits, slip edits, roll edits, etc.

Video displays 2630 allow a user to watch multiple video clips at once, thereby enabling easier selection of in and out points for the video clips. The screen shot 2600 illustrates a few of many different editing tools that a video editing application of some embodiments may have to edit digital video.

In some cases, some or all of the video clips that are displayed in the list of clips 2610, played in displays 2630, and edited by a user with video editing tools 2620, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Returning to FIG. 25, process 2500 next stores (at 2555) the defined elements (i.e., the defined modules, UI items, etc.) on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 2500 are not exhaustive of the modules, rules, processes, and UI items that could be defined and stored on a computer readable storage medium for a media editing application incorporating some embodiments of the invention. In addition, the process 2500 is a conceptual process, and the actual implementations may vary. For example, different embodiments may define the various elements in a different order, may define several elements in one operation, may decompose the definition of a single element into multiple operations, etc. In addition, the process 2500 may be implemented as several sub-processes or combined with other operations within a macro-process.

VI. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 27:
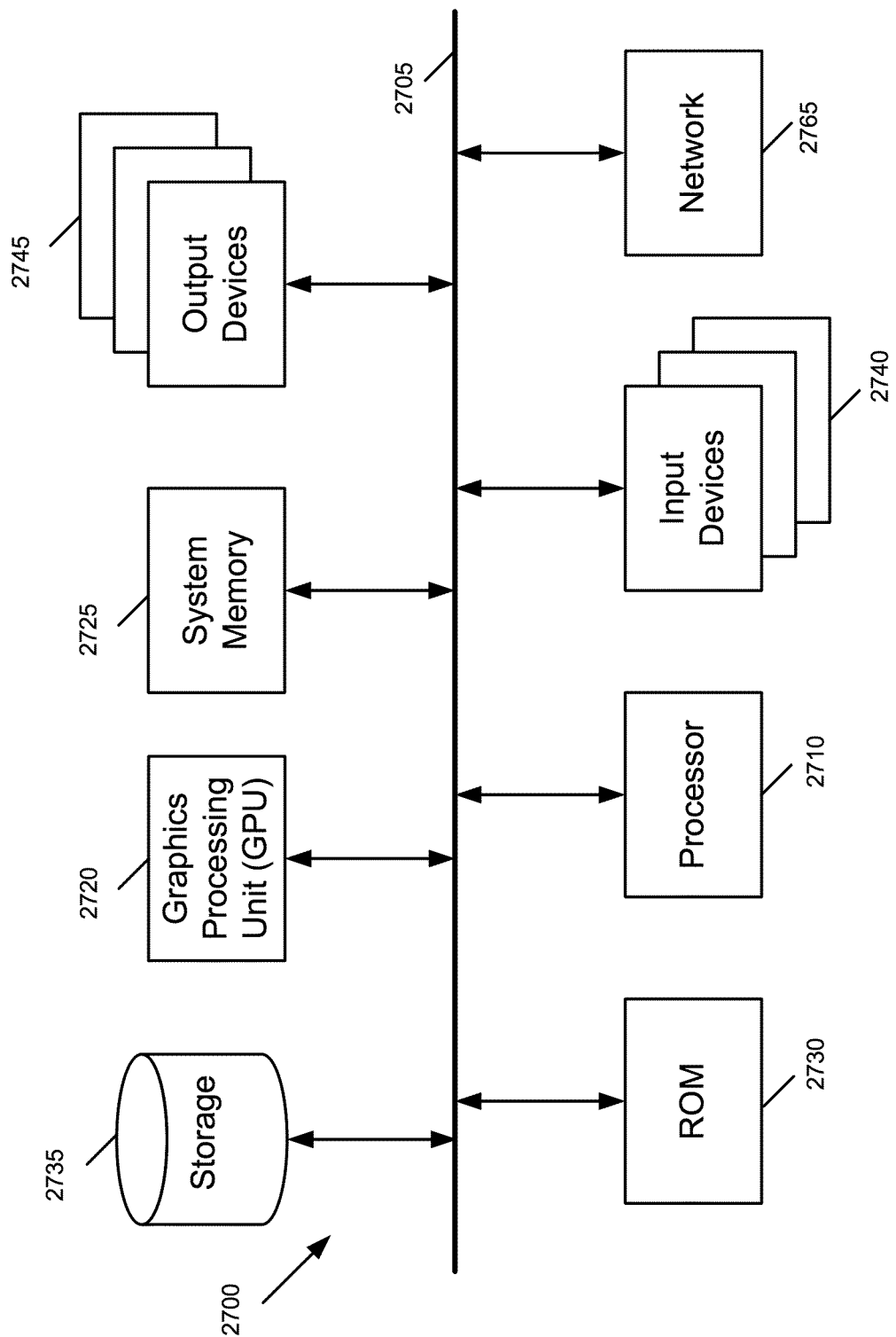
FIG. 27 conceptually illustrates a computer system with which some embodiments of the invention are implemented.

FIG. 27 illustrates a computer system with which some embodiments of the invention are implemented. Such a computer system includes various types of computer readable media and interfaces for various other types of computer readable media. Computer system 2700 includes a bus 2705, a processor 2710, a graphics processing unit (GPU) 2720, a system memory 2725, a read-only memory 2730, a permanent storage device 2735, input devices 2740, and output devices 2745.

The bus 2705 collectively represents all system, peripheral, and chipset buses that communicatively connect the numerous internal devices of the computer system 2700. For instance, the bus 2705 communicatively connects the processor 2710 with the read-only memory 2730, the GPU 2720, the system memory 2725, and the permanent storage device 2735.

From these various memory units, the processor 2710 retrieves instructions to execute and data to process in order to execute the processes of the invention. In some embodiments, the processor comprises a Field Programmable Gate Array (FPGA), an ASIC, or various other electronic components for executing instructions. In some embodiments, the processor Some instructions are passed to and executed by the GPU 2720. The GPU 2720 can offload various computations or complement the image processing provided by the processor 2710. In some embodiments, such functionality can be provided using CoreImage's kernel shading language.

The read-only-memory (ROM) 2730 stores static data and instructions that are needed by the processor 2710 and other modules of the computer system. The permanent storage device 2735, on the other hand, is a read-and-write memory device. This device is a non-volatile memory unit that stores instructions and data even when the computer system 2700 is off. Some embodiments of the invention use a mass-storage device (such as a magnetic or optical disk and its corresponding disk drive) as the permanent storage device 2735.

Other embodiments use a removable storage device (such as a floppy disk, flash drive, or ZIP® disk, and its corresponding disk drive) as the permanent storage device. Like the permanent storage device 2735, the system memory 2725 is a read-and-write memory device. However, unlike storage device 2735, the system memory is a volatile read-and-write memory, such a random access memory. The system memory stores some of the instructions and data that the processor needs at runtime. In some embodiments, the invention's processes are stored in the system memory 2725, the permanent storage device 2735, and/or the read-only memory 2730. For example, the various memory units include instructions for processing multimedia items in accordance with some embodiments. From these various memory units, the processor 2710 retrieves instructions to execute and data to process in order to execute the processes of some embodiments.

The bus 2705 also connects to the input and output devices 2740 and 2745. The input devices enable the user to communicate information and select commands to the computer system. The input devices 2740 include alphanumeric keyboards and pointing devices (also called "cursor control devices"). The output devices 2745 display images generated by the computer system. For instance, these devices display a GUI. The output devices include printers and display devices, such as cathode ray tubes (CRT) or liquid crystal displays (LCD).

Finally, as shown in FIG. 27, bus 2705 also couples computer 2700 to a network 2765 through a network adapter (not shown). In this manner, the computer can be a part of a network of computers (such as a local area network ("LAN"), a wide area network ("WAN"), or an Intranet, or a network of networks, such as the internet For example, the computer 2700 may be coupled to a web server (network 2765) so that a web browser executing on the computer 2700 can interact with the web server as a user interacts with a GUI that operates in the web browser.

Any or all components of computer system 2700 may be used in conjunction with the invention. For instance, in some embodiments the execution of the frames of the rendering is performed by the GPU 2720 instead of the CPU 2710. Similarly, other image editing functions can be offloaded to the GPU 2720 where they are executed before the results are passed back into memory or the processor 2710. However, a common limitation of the GPU 2720 is the number of instructions that the GPU 2720 is able to store and process at any given time. Therefore, some embodiments adapt instructions for implementing processes so that these processes fit onto the instruction buffer of the GPU 2720 for execution locally on the GPU 2720. Additionally, some GPUs 2720 do not contain sufficient processing resources to execute the processes of some embodiments and therefore the CPU 2710 executes the instructions. One of ordinary skill in the art would appreciate that any other system configuration may also be used in conjunction with the present invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory computer readable medium storing a media editing application for creating multimedia presentations, the application comprising a graphical user interface (GUI), the GUI comprising:
    a preview display area for displaying a preview of a composite presentation that the application creates by compositing a plurality of media clips;
    a timeline that represents a duration of the composite presentation;
    a composite display area comprising a plurality of tracks that span the timeline in a horizontal direction to display a graphical representation of the composite presentation, each track displaying one or more graphical representations of media clips that are placed along the horizontal direction of the timeline; and a compression tool for compressing the graphical representation of the composite presentation in the composite display area by performing an automated process that (i) identifies, on one or more tracks, empty spaces that are without clip representations and that are capable of accommodating one or more clip representations without creating an overlap between two clip representations, and (ii) moves at least a first clip representation from a first track and a second clip representation from a second track to identified empty spaces on a third track while maintaining the horizontal placement of the first and second clip representations with respect to the timeline, and while maintaining the first and second clip representations' respective association with the first and second tracks.

2. The non-transitory computer readable medium of claim 1, wherein the clip representations are arranged in a plurality of groups in the composite display area.

3. The non-transitory computer readable medium of claim 2, wherein the plurality of groups comprises an audio group and a video group.

4. The non-transitory computer readable medium of claim 3, wherein each of the audio group and video group comprises a plurality of sub-groups.

5. The non-transitory computer readable medium of claim 2, wherein the compression tool is further for performing the compression separately to each of the groups in the composite display area.

6. The non-transitory computer readable medium of claim 2, wherein the compression tool is further for performing the compression to all of the groups at once such that the clip representations are no longer arranged in the groups after moving the clip representations from one track to another track.

7. The non-transitory computer readable medium of claim 1, wherein the third track in the plurality of tracks is a destination track, wherein the clip representations are all moved towards the destination track in the composite display area upon compression of the graphical representation.

8. The non-transitory computer readable medium of claim 7, wherein the destination track is a topmost track in the composite display area.

9. The non-transitory computer readable medium of claim 1, wherein the clip representations are arranged in an upper group and a lower group, wherein upon compression of the graphical representation, the clip representations in the upper group are moved downward and the clip representations in the lower group are moved upward.

10. The non-transitory computer readable medium of claim 1, wherein the GUI further comprises a plurality of media-editing tools.

11. The non-transitory computer readable medium of claim 10, wherein the media-editing tools comprise a trim tool.

12. A non-transitory computer readable medium storing a computer program which when executed by at least one processor presents a graphical user interface (GUI) of a media-editing application for creating a composite presentation, the computer program comprising sets of instructions for:
    displaying, in a preview display area, a preview of the composite presentation;
    displaying, in a composite display area having a plurality of tracks that span a timeline, a graphical representation of the composite presentation, wherein each track displays one or more graphical representations of media clips that are placed along a horizontal direction of the timeline;
    receiving a user selection of a compression tool;
    identifying, in response to the selection, empty spaces on tracks that are without clip representations that are capable of accommodating one or more clip representations without creating an overlap between two clip representations; and
    compressing the graphical representation of the composite presentation by moving a first clip representation from a first track to an identified empty space on a second track and moving a second clip representation from the first track to an identified empty space on a third track, wherein the first and second clip representations are moved in a vertical direction while maintaining the first and second representations' horizontal placement with respect to the timeline, and while maintaining the first and second clip representations' association with the first track.

13. The non-transitory computer readable medium of claim 12, wherein a particular clip representation of a media clip, which is a part of the composite presentation, is not displayed in the composite display area prior to compressing the graphical representation of the composite presentation.

14. The non-transitory computer readable medium of claim 13, wherein moving the first and second clip representations frees up space such that the particular clip representation is displayed in the composite display area.

15. The non-transitory computer readable medium of claim 12, wherein the plurality of tracks in the composite display area correspond to a plurality of rows prior to performing the compression, wherein the correspondence between the tracks and the rows is eliminated when the first and second clip representations are moved to the respective second and third tracks, wherein the movement of the first and second clip representations does not affect the composite presentation.

16. The non-transitory computer readable medium of claim 12, wherein movement of the first and second clip representations causes the number of tracks that appear in the composite display area to be reduced.

17. A method of defining a media editing application for creating multimedia presentations, the application comprising a graphical user interface (GUI), the method comprising:
    defining a preview display area for displaying a composite presentation that the application creates by compositing a plurality of media clips;
    defining a timeline that represents a duration of the composite presentation;
    defining a composite display area comprising a plurality of rows that span the timeline to display a graphical representation of the composite presentation, each row displaying one or more representations of media clips that are placed along a horizontal direction of the timeline; and
    defining a compression tool for compressing the graphical representation of the composite presentation by performing an automated process that (i) identifies, on one or more of the rows, empty spaces that are without clip representations and that are capable of accommodating one or more clip representations without creating an overlap between two clip representations, and (ii) moves, at least a first clip representation in one vertical direction from a first row to an identified empty space on a second row and a second clip representation in the opposite vertical direction from the first row to an identified space on a third row, wherein the movement maintains the first and second clip representation's horizontal placement with respect to the timeline, and maintains the first and second clip representations' association with the first row.

18. The method of claim 17, wherein each row corresponds to a track in the composite display area, wherein the correspondence between the rows and the tracks is eliminated when the graphical representation of the composite presentation is compressed but each media clip representations's row association is maintained.

19. The method of claim 17, wherein the first and second clip representations are grouped under different groups, wherein the compression tool is further for identifying the different groups to move the first and second clip representations in different vertical directions.

* * * * *